United States Patent
Murakawa

(10) Patent No.: US 8,817,307 B2
(45) Date of Patent: Aug. 26, 2014

(54) INFORMATION PROCESSING DEVICE, PRINT SERVER, PRINT CONTROL SYSTEM, PRINT CONTROL METHOD AND COMPUTER READABLE RECORDING MEDIUM FOR APPLYING PRINTING RULE TO PRINT JOB

(71) Applicant: Akira Murakawa, Chiyoda-ku (JP)

(72) Inventor: Akira Murakawa, Chiyoda-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/683,347

(22) Filed: Nov. 21, 2012

(65) Prior Publication Data

US 2013/0135673 A1   May 30, 2013

(30) Foreign Application Priority Data

Nov. 25, 2011   (JP) ................................. 2011-257080

(51) Int. Cl.
*G06F 3/12* (2006.01)

(52) U.S. Cl.
CPC ............ *G06F 3/1296* (2013.01); *G06F 3/1222* (2013.01); *G06F 3/1288* (2013.01); *G06F 3/1219* (2013.01); *G06F 3/1203* (2013.01); *G06F 3/1239* (2013.01); *G06F 3/1256* (2013.01)
USPC ....................................................... 358/1.15

(58) Field of Classification Search
CPC ........................... G06K 15/4095; G06F 3/1293
USPC ....................................................... 358/1.15
See application file for complete search history.

(56) References Cited

U.S. PATENT DOCUMENTS

2010/0171973 A1   7/2010   Kimura
2013/0321854 A1*  12/2013   Kimura ........................ 358/1.14

FOREIGN PATENT DOCUMENTS

| JP | 11-053142 A   | 2/1999 |
| JP | 2003-196046 A | 7/2003 |
| JP | 2003-303067 A | 10/2003 |
| JP | 2006-338237 A | 12/2006 |
| JP | 2009-259292 A | 11/2009 |
| JP | 2010-160579 A | 7/2010 |

OTHER PUBLICATIONS

Machine translation for JP 2006-338237, IDS.*
Office Action issued by the Japanese Patent Office on Nov. 26, 2013 in corresponding Japanese Patent Application No. 2011-257080 and an English translation of the Official Action. (7 pages).
Japanese Decision to Grant a Patent issued Jun. 17, 2014 in corresponding Japanese Patent Application No. 2011-257080 and English translation (6 pages).

* cited by examiner

*Primary Examiner* — Qian Yang
(74) *Attorney, Agent, or Firm* — Buchanan Ingersoll & Rooney PC

(57) ABSTRACT

An information processing device sends a print job to a print server for applying a printing rule to the print job. The information processing device comprises: a print job generation part for generating the print job; a display part for displaying a printing rule application result showing a result of application by the print server of the printing rule; a manipulation input part for receiving an entry of an instruction as to whether or not to continue a process relating to the print job with the printing rule application result being displayed; and a print job control part for making the process relating to the print job terminate in response to entry of the instruction to refuse continuation of the print job process, while making the print job process continue in response to entry of the instruction to permit the continuation of the print job process.

16 Claims, 17 Drawing Sheets

FIG. 2

RULE INFORMATION 35

| No. | RULE | | | | RULE APPLICATION RESULT | | |
|---|---|---|---|---|---|---|---|
| | FILE NAME | USER NAME | SOURCE | DESTINATION | OUTPUT USER | OUTPUT NOTIFICATION | OUTPUT METHOD |
| 1 | — | — | 192.168.10.* | 192.168.10.11 | — | NOT REQUIRED | AUTOMATIC OUTPUT |
| 2 | SLIP* | USER A | 192.168.10.* | 192.168.12.11 | USER C | REQUIRED | AUTHENTICATION OUTPUT |
| 3 | SLIP* | USER A | — | 192.168.12.11 | USER C | REQUIRED | AUTHENTICATION OUTPUT |
| 4 | SLIP* | — | — | 192.168.12.11<br>192.168.12.12 | USER C<br>USER D | REQUIRED | AUTHENTICATION OUTPUT |
| 5 | SPECIFICATION* | USER A | — | 192.168.10.11 | USER A | REQUIRED | AUTHENTICATION OUTPUT |
| 6 | SPECIFICATION* | — | 192.168.11.* | 192.168.11.11 | — | REQUIRED | AUTHENTICATION OUTPUT |
| 7 | SPECIFICATION* | USER B | — | 192.168.10.11 | USER A | REQUIRED | AUTHENTICATION OUTPUT |
| 8 | — | USER B | 192.168.11.5 | 192.168.11.11 | — | NOT REQUIRED | AUTOMATIC OUTPUT |
| 9 | — | — | — | 192.168.10.11<br>192.168.11.11<br>192.168.12.11<br>192.168.12.12 | SENDER | NOT REQUIRED | AUTHENTICATION OUTPUT |

INFORMATION PROCESSING DEVICE, PRINT SERVER, PRINT CONTROL SYSTEM, PRINT CONTROL METHOD AND COMPUTER READABLE RECORDING MEDIUM FOR APPLYING PRINTING RULE TO PRINT JOB

This application is based on the application No. 2011-257080 filed in Japan, the contents of which are hereby incorporated by reference.

BACKGROUND OF THE INVENTION

1. Field of the Invention

The present invention relates to an information processing device, a print server, a print control system, a print control method and a computer readable recording medium.

2. Description of the Background Art

For producing printed outputs of materials such as a document, a printing rule registered in advance is applied in accordance with information contained in a print job and the printed outputs are produced based on the result of application of the printing rule. The printing rule defining print setting for each print purpose is registered in advance with print devices. This known technique is introduced for example in Japanese Patent Application Laid-Open No. JP 2006-338237 A. According to the conventional technique, in response to receipt of the print job, the print device specifies the print purpose with template information contained in the print job. By applying the printing rule corresponding to the print purpose, the print device produces the printed outputs by configuring the print setting to print on both sides of a sheet (duplex printing) or print multiple pages on a single sheet (multiple pages per sheet printing).

The conventional printing rule applied at printing aims to reduce printing costs. To be more specific, according to the above-described conventional technique, the printing rule registered in advance with the print device automatically configures pages per sheet setting or duplex printing setting in response to the print purpose, which aims to cut back on the number of printed outputs.

A system comprising a print server and multiple image forming devices connected through a network is constructed in conventional environments such as offices. The system enables the print server to sort and output the print jobs to the respective image forming devices connected through the network. On this system, the print job generated in the network is just sent to the print server. The most conventional print servers are configured to output the print job received over the network to the image forming device designated in advance by the user who is the sender of the print job.

On the above-described system, the printing rule may be registered in advance with the print server in the years ahead. In this case, the printing rules registered in advance with the print server may be diverse in contrast with the conventional printing rules. Such diversified printing rules registered in advance may include a rule to determine the image forming device of the multiple image forming devices, for example, to which the print job is output or a rule to determine a user who is allowed to take the printed outputs produced as a result of execution of the print job. The print server applies the printing rule to the print job received over the network, thereby automatically determining which image forming device outputs the print job or the user who is allowed to take the printed outputs produced as the result of execution of the print job based on the printing rule. The print server is allowed to automatically determine and proceed with the process after receipt of the print job based on the printing rules.

The print server may apply the printing rule to determine and proceed with the later process corresponding to the print job. In this case, the user who gives an instruction to send the print job is not allowed to know how the process of the print job is proceeded after giving the instruction. Therefore, sometimes, the printed output is produced by the image forming device that the user who gives the instruction to send the print job does not expect, or the printed output is taken by the user that the user who gives the instruction to send the print job does not expect. Especially when the produced printed output as mentioned above contains confidential information, this involves a serious issue on security.

SUMMARY OF THE INVENTION

The present invention is intended to solve the above problems. Thus, the present invention is intended to provide an information processing device, a print server, a print control system, a print control method and a computer readable recording medium capable of preventing a printed output that a user who gives an instruction to send a print job does not expect from being produced when a print server is configured to apply a printing rule to produce the printed output.

First, the present invention is directed to an information processing device for sending a print job to a print server for applying a printing rule to the print job, thereby outputting the print job to one of a plurality of image forming devices. The information processing device and the print server are connected through a network.

According to one aspect of the information processing device, the information processing device, comprises: a print job generation part for generating the print job to send to the print server; a display part for displaying a printing rule application result showing a result of application by the print server of the printing rule after the print job is generated by the print job generation part; a manipulation input part for receiving an entry of an instruction as to whether or not to continue a process relating to the print job with the printing rule application result being displayed with the display part; and a print job control part for making the process relating to the print job terminate in response to entry of the instruction to refuse continuation of the print job process via the manipulation input part, while making the print job process continue in response to entry of the instruction to permit the continuation of the print job process.

Second, the present invention is directed to a print server for applying a printing rule to a print job received from an information processing device, thereby outputting the print job to one of a plurality of image forming devices.

According to one aspect of the print server, the print server, comprises: a storage part for storing therein the printing rule that determines the image forming device to which the print job is output among from the plurality of image forming devices; a print job receipt part for receiving the print job from the information processing device; a printing rule application part for applying the printing rule in the storage part to the print job received through the print job receipt part and determining the image forming device to which the print job is output among from the plurality of image forming devices; a process continuation determination part for determining whether or not to continue a process relating to the print job based on a printing rule application result determined by the printing rule application part; and a print job output control part for outputting the print job to the image forming device determined by the printing rule application part in response to the determination by the printing rule application part to continue the process relating to the print job. The process continuation determination part causes the information processing device to display the printing rule application result, and makes the print job process terminate responsive to entry from the information processing device of an instruction to refuse continuation of the print job process, while making the print job process continue responsive to entry of the instruction to permit the continuation of the print job process.

Third, the present invention is directed to a print control system comprising an information processing device for sending a print job to a print server and the print server for outputting the print job thereby received to one of a plurality of image forming devices.

According to one aspect of the information processing system, the print server includes: a storage part for storing therein a printing rule that determines at least one of items, the items including a user allowed to take a printed output produced in response to execution of the print job and the image forming device of the plurality of image forming devices to which the print job is output; a print job receipt part for receiving the print job from the information processing device; a printing rule application part for applying the printing rule in the storage part to the print job received through the print job receipt part and determining the image forming device to which the print job is output among from the plurality of image forming devices; and a print job output control part for performing an output process of the print job to the image forming device determined by the printing rule application part. The information processing device includes: a display part for displaying the result of application by the printing rule application part of the printing rule to the print job prior to the output process performed by the print job output control part on the print server; and a manipulation input part for receiving an entry of an instruction as to whether or not to continue a print job process with the printing rule application result being displayed with the display part. The print job process is made terminate responsive to entry of the instruction to refuse continuation of the print job process via the manipulation input part, while the print job process is made continue responsive to entry of the instruction to permit the continuation of the print job process.

Forth, the present invention is directed to a print control method for an information processing device to send a print job to a print server and for the print server to output the print job to one of a plurality of image forming devices.

According to an aspect of the print control method, the print control method, comprises the steps of: (a) generating the print job in the information processing device; (b) sending the print job by the information processing device to the print server; (c) applying a printing rule to the print job received from the information processing device in the print server, thereby determining the image forming device to which the print job is output among from the plurality of image forming devices; and (d) outputting the print job by the print server to the image forming device determined in response to application of the printing rule. The print control method further comprises the step of: (e) displaying a printing rule application result by the information processing device showing a result of application of the printing rule to the print job and making a user check the displayed printing rule application result prior to the step (d).

Fifth, the present invention is directed to a computer readable recording medium on which a program is recorded. The program is executable on an information processing device for sending a print job to a print server for applying a printing rule to the print job, thereby outputting the print job to one of a plurality of image forming devices. The information processing device and the print server are connected through a network.

According to an aspect of the computer readable recording medium, the program causes the information processing device to function as a system comprising: a print job generation part for generating the print job to send to the print server; a display control part for displaying a printing rule application result showing a result of application by the print server of the printing rule after the print job is generated by the print job generation part; and a print job control part for making a process relating to the print job terminate in response to entry of an instruction to refuse continuation of the print job process with the printing rule application result being displayed by the display control part, while making the print job process continue in response to entry of the instruction to permit the continuation of the print job process.

Sixth, the present invention is directed to a computer readable recording medium on which a program is recorded. The program is executable on a print server for outputting a print job received from an information processing device to one of a plurality of image forming devices.

According to an aspect of the computer readable recording medium, the program causes the print server to function as a system comprising: a registration part for registering a printing rule that determines the image forming device to which the print job is output among from the plurality of image forming devices; a print job receipt part for receiving the print job from the information processing device; a printing rule application part for applying the printing rule registered by the registration part to the print job received through the print job receipt part and determines the image forming device to which the print job is output among from the plurality of image forming devices; a process continuation determination part for determining whether or not to continue a process relating to the print job based on a printing rule application result determined by the printing rule application part; and a print job output control part for outputting the print job to the image forming device determined by the printing rule application part in response to the determination by the printing rule application part to continue the process relating to the print job. The process continuation determination part causes the information processing device to display the printing rule application result, and makes the print job process terminate in response to entry from the information processing device of an instruction to refuse continuation of the print job process, while making the print job process continue in response to entry of the instruction to permit the continuation of the print job process.

BRIEF DESCRIPTION OF THE DRAWINGS

FIG. 2 is an example of rule information stored in advance on a print server;

DESCRIPTION OF THE PRESENT PREFERRED EMBODIMENTS

Figure 1:
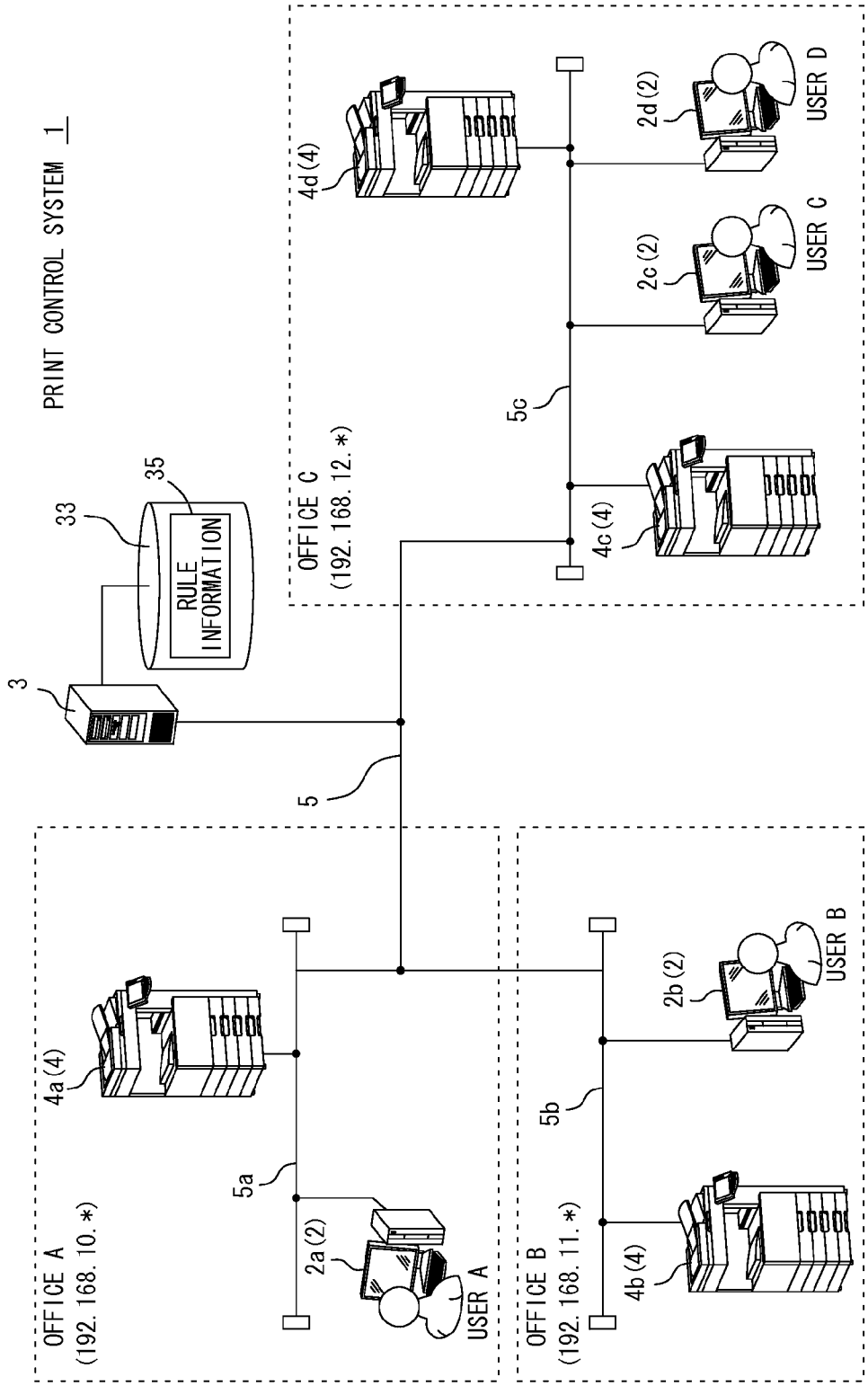
FIG. 1 shows an exemplary configuration of a print control system.

Preferred embodiments of the present invention are described in detail below with reference to figures. In the description given below, those elements which are shared in common among figures are represented by the same reference numerals, and these elements are not discussed repeatedly for the same description.

(Summary of a Print Control System)

FIG. 1 shows an exemplary configuration of a print control system 1 of present preferred embodiments. The print control system comprises a plurality of information processing devices 2, a print server 3 and a plurality of image forming devices 4 connected with each other through a network 5 such as a LAN (Local Area Network). In some companies, for example, each device is installed at different business places, floors or offices as shown in FIG. 1. According to an example of FIG. 1, an information processing device 2a and an image forming device 4a are installed at an office A, and an information processing device 2b and an image forming device 4b are installed at an office B. Further, information processing devices 2c and 2d and image forming devices 4c and 4d are installed at an office C. The print server 3 may be installed at any of the offices A, B and C, or another office.

Networks 5a, 5b and 5c forming a part of the network 5 are set in the respective offices A, B and C. Different network addresses are assigned to the respective networks 5a, 5b and 5c. The network 5 may include an external network such as an internet besides the networks 5a, 5b and 5c.

Each of the plurality of information processing devices 2 is formed from a generally-used personal computer, for instance. The information processing device 2 is individually allocated to each user in the offices A, B and C. The information processing device 2 generates the print job in response to the user's instruction. As generating the print job in response to the user's instruction, the information processing device 2 sends the generated print job to the print server 3 over the network 5.

After receiving the print job from the information processing device 2, the print server 3 stores therein the received print job, and selects to designate the image forming device 4 to which the print job is output among from the plurality of image forming devices 4 connected through the network 5. The print server 3 includes a storage device 33 formed from a device such as a hard disk device. The storage device 33 stores therein in advance rule information 35. At least one printing rule is registered as the rule information 35. In response to receipt of the print job, the print server 3 reads the rule information 35 and applies the printing rule to the received print job. The print server 3 determines process detail on the print job based on the result of the application of the printing rule (hereafter, printing rule application result).

The image forming device 4 acquires the print job from the print server 3 and executes the acquired print job, thereby producing printed outputs. To be more specific, as receiving the print job, the image forming device 4 produces the printed output by forming an image on a sheet material such as a printing paper based on the print job. The image forming device 4 may be a device with a single print function that produces the printed outputs or one of MFPs with multiple functions such as a scan function or a fax function in addition to the print function.

FIG. 2 is an example of the rule information 35 stored in advance on the print server 3. There are nine printing rules registered as the rule information 35 of FIG. 2. The printing rules are registered as the rule information 35 by an administrator of the print server 3, for example.

Each printing rule registered as the rule information 35 as shown in FIG. 2 contains a rule defining a condition for application of the printing rule and a rule application result defining the process detail on the print job specified by applying the printing rule. For an item of the respective printing rules for which no condition or process detail is defined, "–" is recorded in the example of FIG. 2.

The printing rule registered as the rule information 35 of the present preferred embodiments contains the rule application result including an item defining the image forming device 4 to which the print job (hereafter, destination of the print job) is output and an item defining the user who is allowed to take the printed output produced in response to the print job. Such items that are not contained in the conventional printing rules are allowed to be defined. The print server 3 applies the printing rule, thereby automatically designating the image forming device 4 to which the print job should be output or the user allowed to take the printed output as the later process detail on the received print job.

The printing rule of "No. 2" defines 3 conditions as conditions for application of the printing rule. The printing rule is applied only when a file name is "*slip," the user who gave the instruction to send the print job is "user A" and the print job is sent from an address "192.168.10.*". When the print server 3 receives the print job that meets those 3 conditions, it applies the printing rule "No. 2" to the received print job.

The printing rule "No. 2" defines 4 process details as a process detail of the print job specified in response to the application of the printing rule. The defined process details on the print job are to output the print job to the image forming device 4 having its address "192.168.12.11," to limit the user who is allowed to cause the image forming device 4 to output the print job to only "user C," to configure output notification that notifies the user gave the instruction to send the print job or allowed to cause the image forming device 4 to output the print job to "required," and to configure output method for printing to "authentication output". When the print server 3 applies the printing rule "No. 2" to the received print job, it determines the above-described process details.

Figure 3:
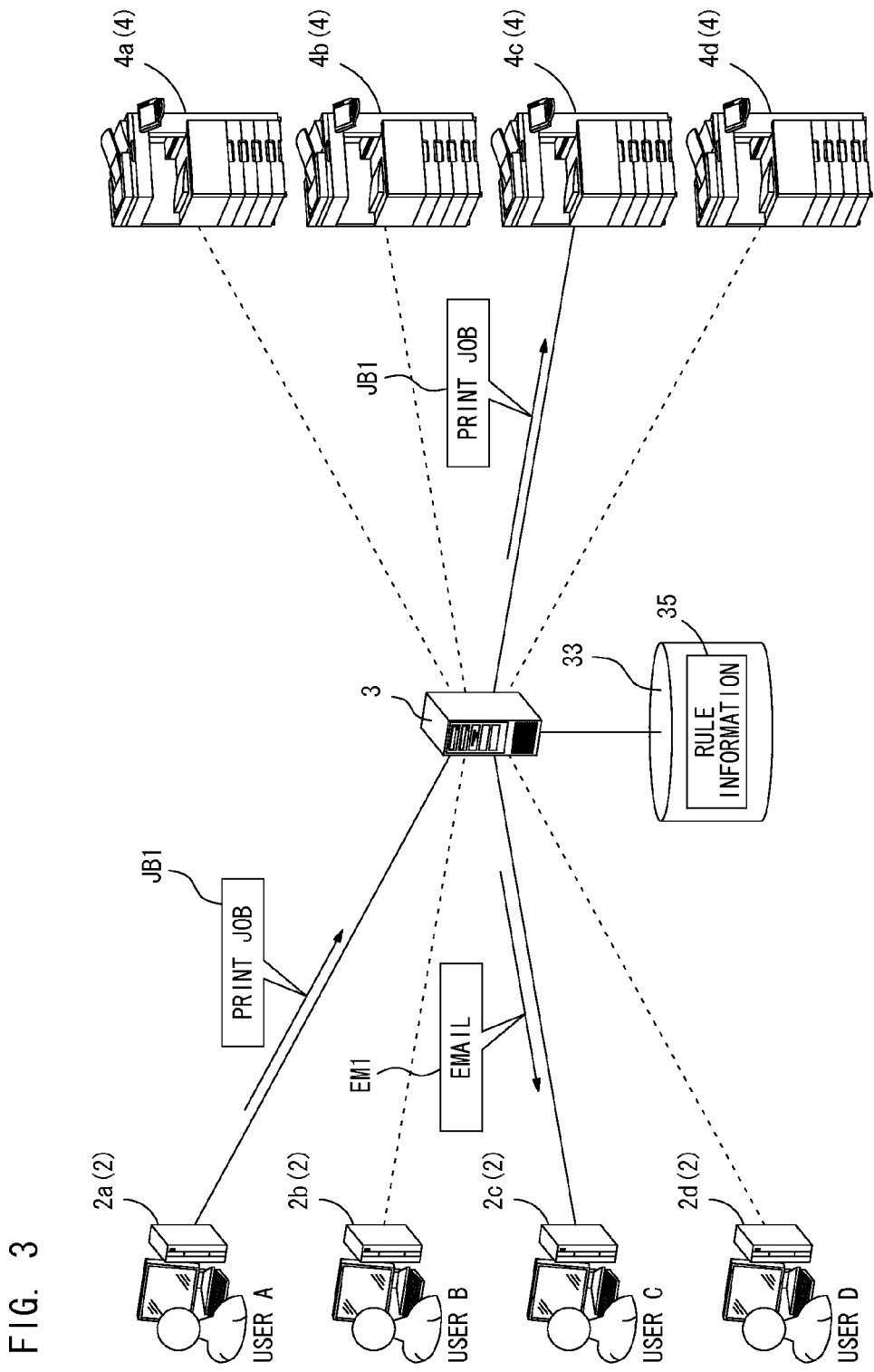
FIG. 3 shows an exemplary process concept performed when the print server applies a printing rule and automatically proceeds with a print output process.
Figure 4:
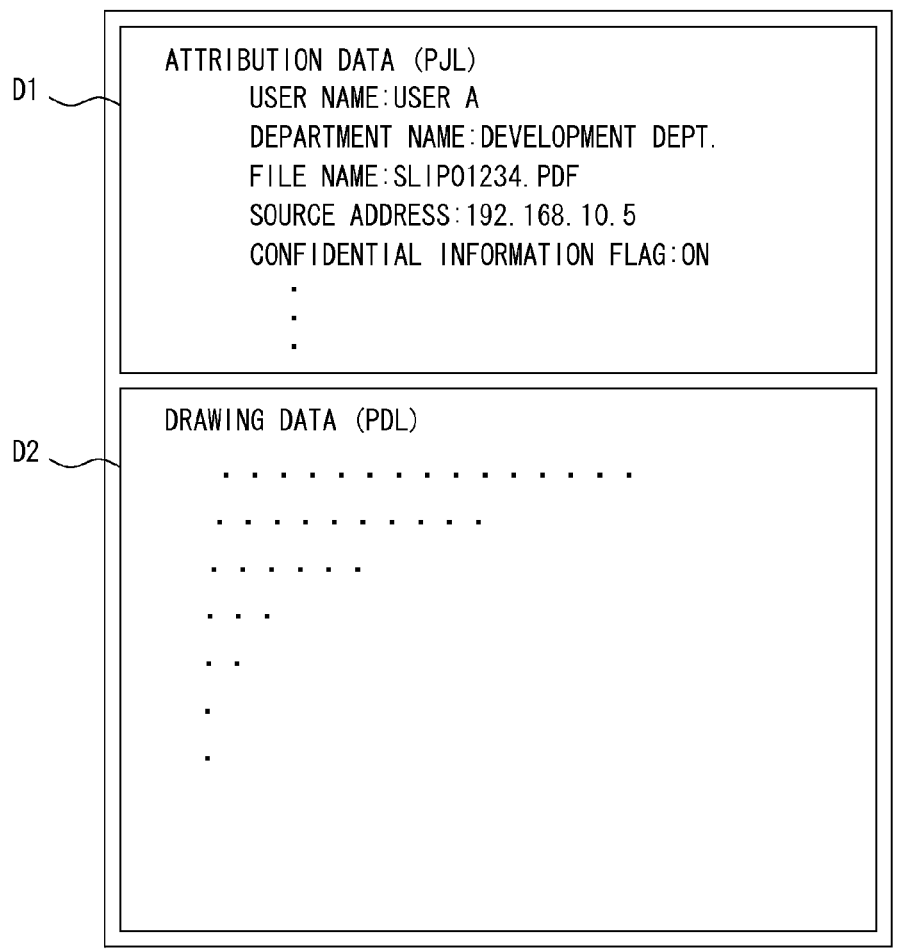
FIG. 4 shows an exemplary concept of a print job sent to the print server from an information processing device.

FIG. 3 shows an exemplary process concept performed when the print server 3 applies the printing rule "No. 2". FIG. 4 shows an exemplary concept of a print job JB1 sent to the print server 3 from the information processing device 2. The information processing device 2*a* is operated by the user A to edit the document having its file name "* slip" and give an instruction to send the print job. In response to the instruction to send the print job, the information processing device 2*a* sends the print job JB1 to the print server 3 as illustrated in FIG. 3.

The print job JB1 contains attribution data D1 in PJL (Print Job Language) and drawing data D2 in PDL (Print Description Language) as shown in FIG. 4. The attribution data D1 contains various types of data for use in determining the condition for application of the printing rule. The various types of data includes a user name of the user who gives the instruction to send the print job, a department name where the user works at, a file name of the data to print and information such as confidential information flag which is set when confidential information is contained in the data to print, for example. The drawing data D2 is for use by the image forming device 4 in forming an image. The drawing data D2 is, for example, bitmap image data for drawing turned from the data to print by RIP (Raster Image Processing). When RIP is executed on the print server 3 or the image forming device 4, the drawing data D2 may include the data to print as it is before turned by RIP.

As illustrated in FIG. 3, after receiving the print job JB1 from the information processing device 2*a*, the print server 3 applies the printing rule according to the attribution data D1 in the print job JB1. When, for example, the rule information 35 as shown in FIG. 2 is stored on the print server 3, the print server 3 matches the information in the attribution data D1 up with each rule of the printing rule registered as the rule information 35 one-by-one. The printing rule defining the conditions matching any of the information in the attribution data D1 is extracted. For the example of FIG. 4, the print server 3 extracts 3 printing rules, "No. 2," "No. 3" and "No. 4."

When more than one printing rule is extracted, the print server 3 narrows the more than one printing rule down to one that should be applied to the print job JB1. A printing rule that includes the most conditions that match the respective information in the attribution data D1 than other printing rules may be selected. Also, when the weight of the condition is classified, the calculation is performed based on the weighting and a printing rule may be selected. For selecting the printing rule that includes the most conditions that match the respective information in the attribution data D1, the print server 3 narrows the printing rule that should be applied to the print job JB1 down from 3 printing rules "No. 2," "No. 3" and "No. 4" to the "No. 2" printing rule.

As explained above, as receiving the print job JB1 from the information processing device 2, the print server 3 specifies a printing rule to apply to the received print job JB1 among from the multiple printing rules registered as the rule information 35. Some received print jobs JB1 may not match any of the conditions defined by the multiple printing rules registered as the rule information 35. In such a case, the print server 3 is not capable of automatically determining the later process for the print job based on the printing rule. So, the later process is proceeded in accordance with the process detail specified in advance by the user who gave the instruction to send the print job, for instance.

As specifying the printing rule to apply to the print job JB1 as described above, the print server 3 applies the specified printing rule to the printing job JB1 and produces the printing rule application result. So, the print server 3 extracts the printing rule application result defined by the printing rule, thereby determining the later process detail on the print job JB1 and produces the determined process detail as the printing rule application result. When applying the "No. 2" printing rule as described above, the print server 3 sets the image forming device 4*c* having its address "192.168.12.11" as the destination of the print job JB1 received from the information processing device 2*a*. The print server 3 further determines the "user C" as the user who is allowed to take the printed output produced in response to the execution of the print job JB1. The print job JB1 may cause only the image forming device 4*c* installed at the office C which is different from the office A to produce the printed output. The user C who is another user than the user A is allowed to take the printed output.

In accordance with the "No. 2" printing rule, the output notification is "required." The print server 3 determines to notify the user C that the print job JB1 is ready for the output. When the printing rule defines that the output notification is "not required," such notification is not sent to the user.

The "No. 2" printing rule also defines "authentication output" for the output method. The print server 3 determines that the print job JB1 is output to the image forming device 4*c* while the image forming device 4*c* is being logged-in by the user C who operated the image forming device 4*c* to give an instruction for authentication. When the printing rule defines "automatic output" for the output method, the print job JB1 is automatically output, whether or not the image forming device 4, the destination is logged-in by the user allowed to output.

As shown in FIG. 3, responsive to receipt of the print job JB1 from the information processing device 2*a*, the print server 3 determines the process detail on the print job JB1 as explained above. The print server 3 then proceeds with the later process based on the determination. More specifically, the print server 3 notifies the user C that the print job JB1, he or she is allowed to output is stored by sending an email EM1 to the user C. The email EM1 also includes the information as to the image forming device 4*c* which may be caused to output the print job JB1. As a result, the user C may notice that the print job JB1 that he or she should make the printed output produce is stored in the print server 3.

The user C who is noticed the print job JB1 goes to the place where the image forming device 4*c* is installed at to make an operation for authentication and log into the image forming device 4*c*. The user C checks with the print server 3 if there is an executable print job through an operation to an operational panel of the image forming device 4*c*. Responsive to the query, the print server 3 sends data of the print job executable for the user C in a list form. The data of the print job in the list form is displayed on a screen of the operational panel of the image forming device 4*c*. As the print job JB1 of the data in the list form is selected by the user C, the print server 3 sends the print job JB1 received from the information processing device 2*a* to the image forming device 4*c*. The image forming device 4*c* then executes the print job JB1 received from the print server 3 to produce the printed output. The printed output produced by the image forming device 4*c* is taken by the user C.

The print control system of the present preferred embodiments is configured to cause the printing rule to be registered in advance with the print server 3, and cause the later process detail on the print job JB1 to be determined through application of the printing rule to the print job JB1 after receipt of the print job by the print server 3. The printing rule registered in advance with the print server 3 is different from the conventional printing rules. As described above, according to the printing rule, it is determined that the user who is allowed to take the printed output produced as the result of the execution of the print job and/or it is automatically determined the image forming device 4 which is caused to output the print job among from the plurality of image forming devices 4. In the present preferred embodiments, the print rule may contain the rule application result including information of settings such as the print settings applied at producing printed output as well as the conventional printing rules.

The user gave the instruction to send the print job may have designated the image forming device 4 as the destination. Even in this case, the designation of the destination is ignored when the printing rule is applied by the print server 3. The print server 3 determines the image forming device which is destination of the print job based on the process detail defined by the printing rule. The print control system 1 with the above-described configuration of the present preferred embodiments is configured to cause the user gave the instruction to send the print job to check the printing rule application result and to determine whether or not to continue the process of the print job based on the user's instruction before the print job is output to the image forming device 4, the destination of the print job determined by the print server 3 based on the printing rule. This is for the print control system 1 to prevent the compromising of the security when the printed output is produced in a manner unexpected to the user gave the instruction to send the print job.

There are two detailed preferred embodiments for making the user gave the instruction to send the print job check the printing rule application result.

According to a first preferred embodiment, prior to sending the print job, the information processing device 2 acquires the rule information 35 from the print server 3 and produces the printing rule application result, thereby making the user check the printing rule application result. According to a second preferred embodiment, the print server 3 applies the printing rule to the received print job and produces the printing rule application result. With the produced printing rule application result, the print server 3 sends the printing rule application result to the information processing device 2 which sent the print job and causes the information processing device 2 to display the printing rule application result before proceeding with the process based on the produced printing rule application result, thereby making the user check the produced printing rule application result. In the first and the second preferred embodiments, the functional configurations of the information processing device 2 and the print server 3 slightly differ with each other. Each of the first and the second preferred embodiments, therefore, is explained in detail next.

(First Preferred Embodiment)

Figure 5:
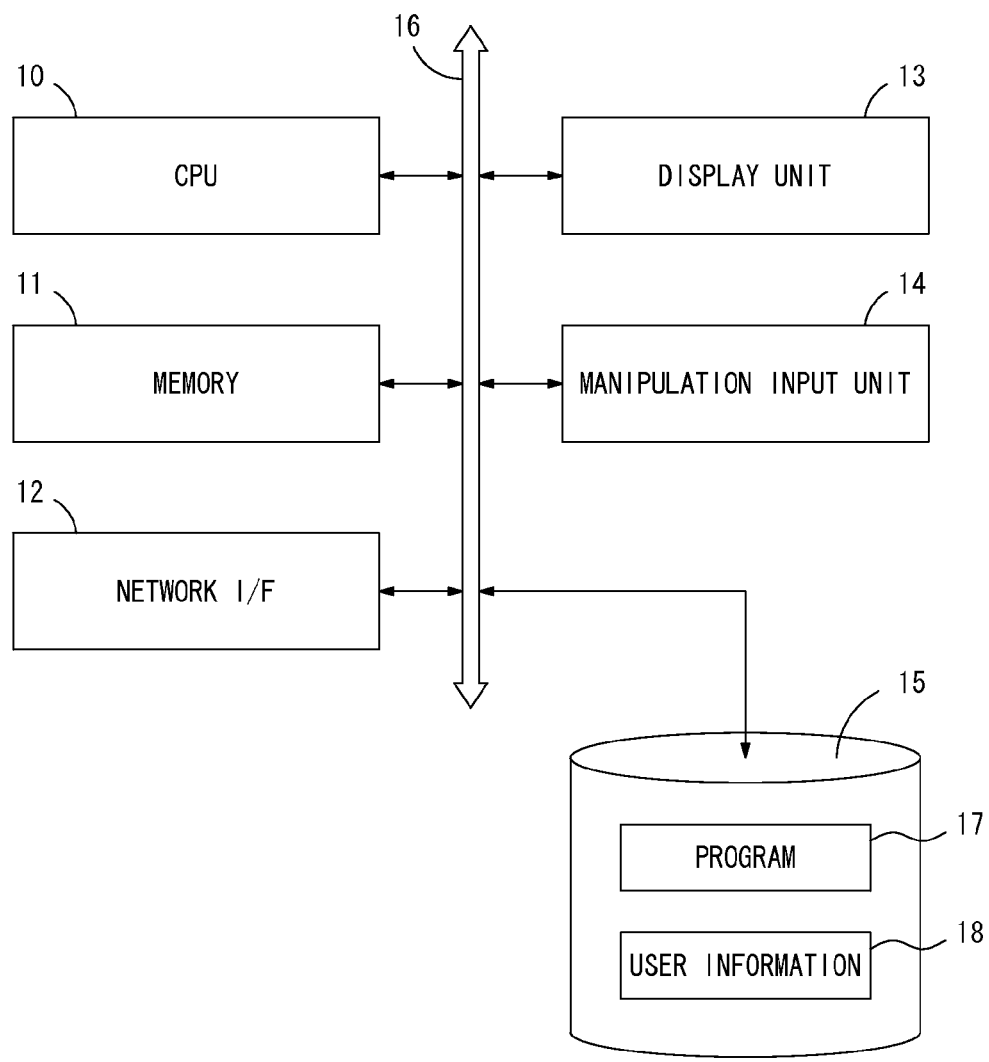
FIG. 5 is a block diagram showing the hardware configuration of the information processing device.

The first preferred embodiment is described at first. FIG. 5 is a block diagram showing the hardware configuration of the information processing device 2. As illustrated in FIG. 5, the information processing device 2 includes a CPU 10, a memory 11, a network interface 12, a display unit 13, a manipulation input unit 14 and a storage device 15 that are connected to each other to allow data input and output between these parts through the data bus 16.

The CPU 10 reads and executes a program 17 installed in advance in the storage device 15, thereby becoming operative to function as each processing part described later. The memory 11 stores therein data such as temporary data required in accordance with execution of the program 17 by the CPU 10. The network interface 12 is for connecting the information processing device 2 to the network 5. The display unit 13, on which various types of information are displayed to the user who operates the information processing device 2, is formed from a device such as a liquid crystal display. The manipulation input unit 14 is configured with a device including a keyboard and a mouse, and receives a variety of operations for instructions made by the user. The storage device 15 is formed from a nonvolatile storage device such as a hard disk drive. The storage device 15 stores therein the program 17 which becomes operative to function as a driver such as a printer driver, for example, installed in advance. The storage device 15 also stores therein user information 18 as to the user who uses the information processing device 2. Although the storage device 15 stores therein a variety of programs and information besides the program and information mentioned above, they are not shown in FIG. 5.

Figure 6:
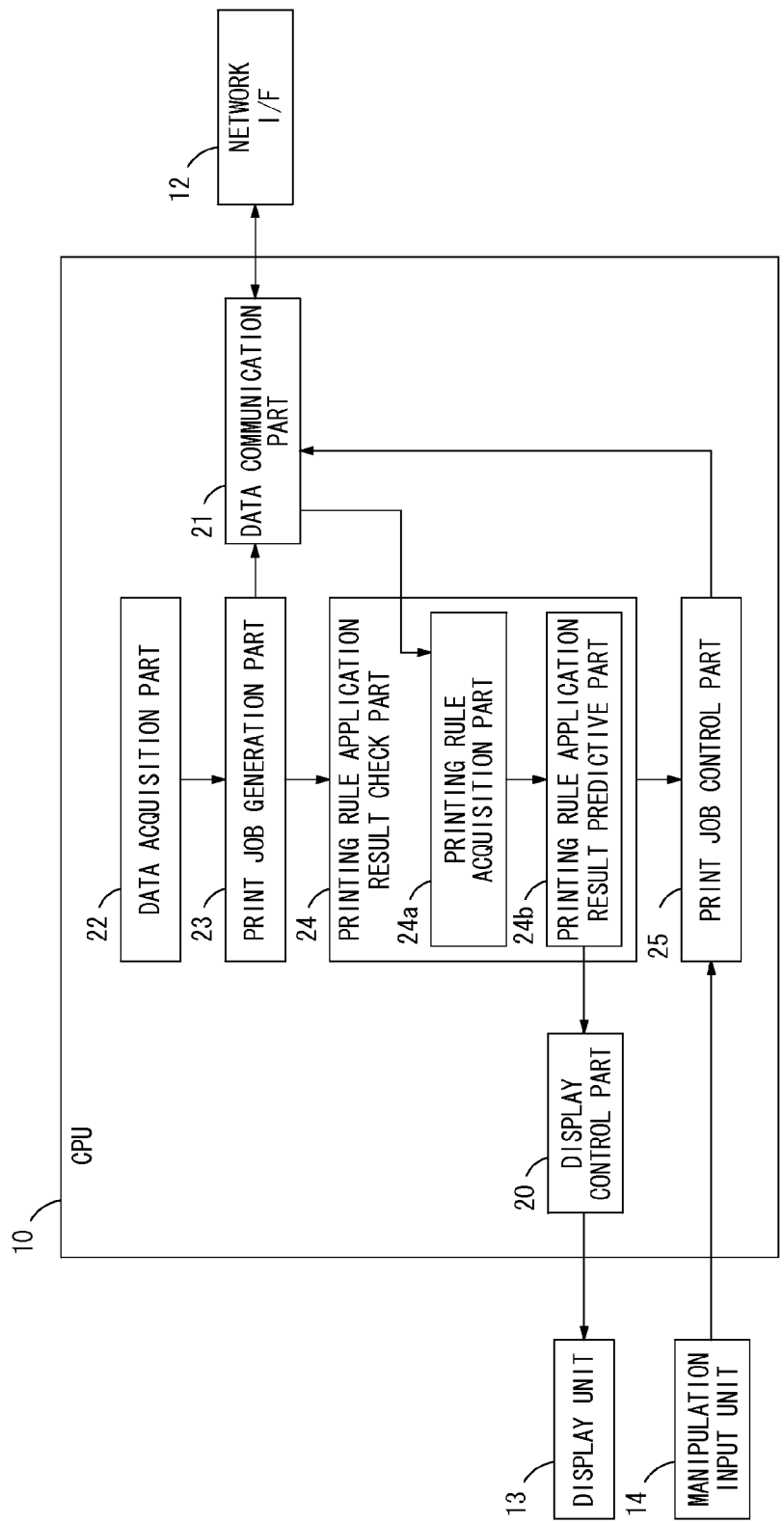
FIG. 6 is a block diagram showing the functional configuration realized on the information processing device of a first preferred embodiment.

FIG. 6 is a block diagram showing the functional configuration realized by execution of the program 17 by the CPU 10. With an application program for document edit and creation, for example, being executed on the information processing device 2, the user gives the instruction to send the print job while working on the editing task. In response to the instruction, the CPU 10 reads and executes the program 17, thereby becoming operative to function as a variety of processing parts of FIG. 6. The CPU 10 functions as a display control part 20, a data communication part 21, a data acquisition part 22, a print job generation part 23, a printing rule application result check part 24 and a print job control part 25. The printing rule application result check part 24 of the first preferred embodiment further functions as a printing rule acquisition part 24a and a printing rule application result predictive part 24b.

The display control part 20 controls display screen image displayed on the display unit 13. The display control part 20 causes the printing rule application result output from the printing rule application result check part 24 to be displayed on the display unit 13. The data communication part 21 establishes data communication with the print server 3 via the network interface 12.

The data acquisition part 22 acquires the data to print from the application program. As the data to print is acquired by the data acquisition part 22, the print job generation part 23 generates the print job based on the data. For generation of the print job, the print job generation part 23 creates the attribution data D1 and the drawing data D2 as illustrated in FIG. 4, sequentially. The attribution data D1 is for use in determining the condition for application of the printing rule. The data volume is not so big. The drawing data D2 is data such as the bitmap image. The volume of the drawing data D2 may exceeds tens of mega bytes. Upon the start of generation of the print job, therefore, the print job generation part 23 completes creating the attribution data D1 first and then the drawing data D2. After generating the print job as described above, the print job generation part 23 outputs the generated print job to the printing rule application result check part 24 and the data communication part 21. As receiving the print job from the print job generation part 23, the data communication part 21 stores the received print job in the memory 11 or the storage device 15 temporarily and is put into a waiting state for the instruction from the print job control part 25.

The printing rule application result check part 24 makes the user check the printing rule application result showing the result of the application of the printing rule to the print job generated by the print job generation part 23. In the printing rule application result check part 24, the printing rule acquisition part 24a becomes operative to function at first. The printing rule acquisition part 24a acquires the rule information 35 from the print server 3 through data communication with the print server 3 via the data communication part 21. The printing rule acquisition part 24a sends a request for sending the printing rule to the print server 3 and acquires the rule information 35 from the print server 3 in reply to the request.

The printing rule application result predictive part 24b becomes operative to function next. The printing rule application result predictive part 24b specifies the printing rule to apply to the print job based on the rule information 35 acquired by the printing rule acquisition part 24a and produces the printing rule application result by applying the printing rule to the print job. The printing rule application result predictive part 24b outputs the produced printing rule application result to the display control part 20, thereby causing the printing rule application result to be displayed on the display unit 13.

Thus, the user who gave the instruction to send the print job is allowed to check the result of application of the printing rule to the print job and determine whether or not to continue the process relating to the print job.

The manipulation input unit 14 receives the instruction as to whether or not to continue the process relating to the print job with the printing rule application result being displayed on the display unit 13 and outputs the received instruction to the print job control part 25. The print job control part 25 controls continuation of the print job process based on the user's instruction entered via the manipulation input unit 14. To be more specific, when the instruction to refuse the continuation of the process relating to the print job is entered by the user, the print job control part 25 cancels the later process relating to the print job and terminates the print job process. When, on the other hand, the instruction to permit the continuation of the print job process is entered, the print job control part 25 proceeds with the later process relating to the print job.

When the print job control part 25 receives the above-described instruction, the print job generated by the job generation part 23 is being temporarily stored in the memory 11 or the storage device 15 by the data communication part 21 and that has not been sent to the print server 3 yet. The print job control part 25 sends an instruction to delete the print job to the data communication part 21 to terminate the print job process. The data communication part 21 then deletes the print job in the memory 11 or the storage device 15. So, in this case, the print job generated by the job generation part 23 is cancelled before being sent to the print server 3. In contrast, the print job control part 25 sends an instruction to continue the process to the data communication part 21 to proceed with the print job process. The data communication part 21 reads and sends the print job in the memory 11 or the storage device 15 to the print server 3. As receiving the print job, the print server 3 applies the printing rule to the print job, thereby determining the later process detail and proceeding with the process based on the determination.

The process to produce the printing rule application result by acquiring the rule information 35 from the print server 3 by the printing rule application result check part 24 of the above-described information processing device 2 is preferably started when the creation of the attribution data D1 by the print job generation part 23 is complete. As a result, the process to produce the printing rule application result may be proceeded before the creation of the drawing data D2 is complete. The printing rule application result is allowed to be provided to the user who gave the instruction to send the print job in a short period of time.

When the "No.4" printing rule of FIG. 2 is applied to the print job, for instance, the printing rule application result produced by the printing rule application result predictive part 24b contains two image forming devices 4 as the destination and two users C and D as the user allowed to output. The plurality of image forming devices 4 may be determined as the destination, or more than one user is determined as the user allowed to take the printed outputs with the printing rule application result. In such a case, a display screen image that allows the user who gave the instruction to send the print job to select the desired image forming device or user among from the plurality of image forming devices or the more than one user is preferably displayed for displaying the printing rule application result. The manipulation input unit 14 receives the selecting operation given by the user. The print job control part 25 narrows the image forming devices 4 to be the destination down to one, or narrows the users allowed to take the printed outputs to one based on the selecting operation. The print job control part 25 preferably proceeds with the print job process after designating the targeted image forming device 4 or user.

Thus, even when the print job process is proceeded, it may prevent the printed output from being produced by the image forming devices 4 unexpected to the user who gave the instruction to send the print job or the contents of the printed output from being seen by the unintended user for the user who gave the instruction to send the print job.

Figure 7:
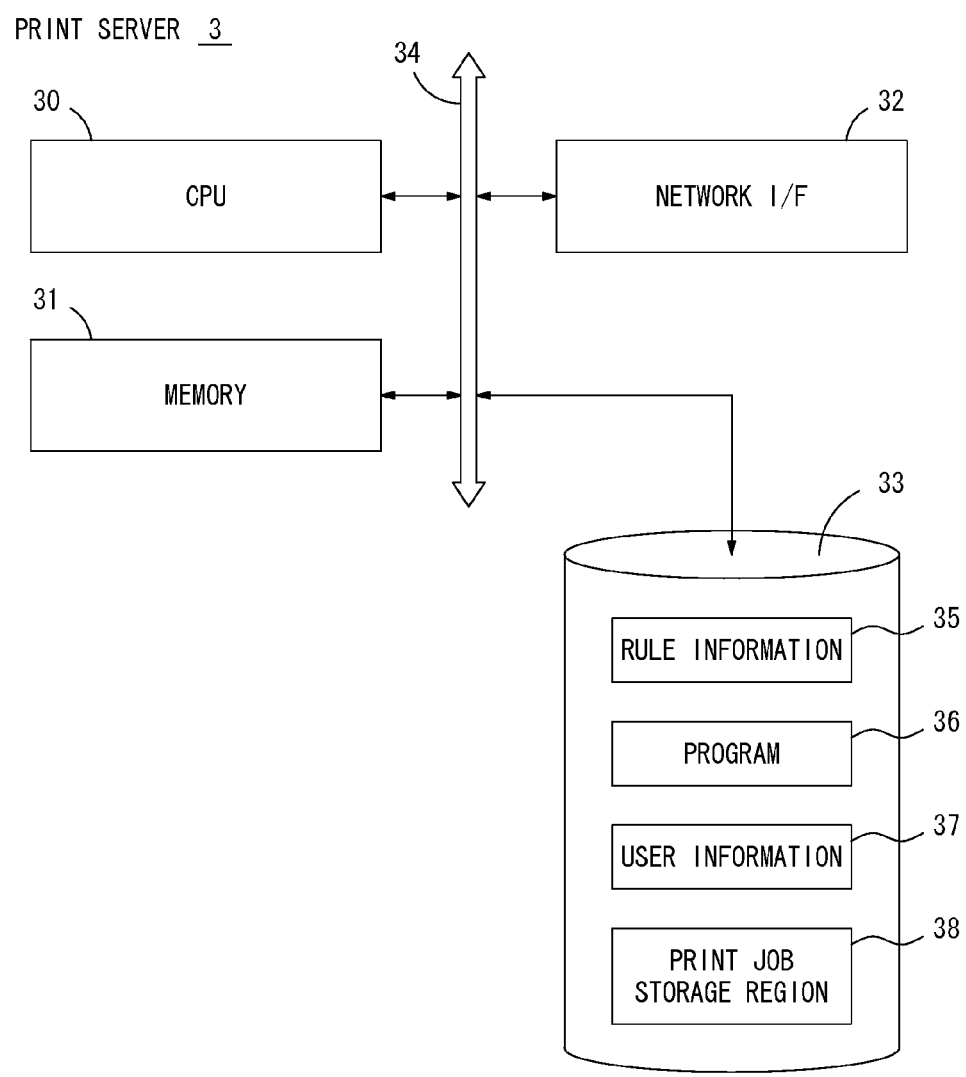
FIG. 7 is a block diagram showing the hardware configuration of the print server.

FIG. 7 is a block diagram showing the hardware configuration of the print server 3. Referring to FIG. 7, the print server 3 includes a CPU 30, a memory 31, a network interface 32 and the storage device 33 that are connected to each other to allow data input and output between these parts through a data bus 34. The storage device 33 stores therein a program 36 which is executed by the CPU 30 and user information 37 as to the user who uses the print server 3 besides the above-mentioned rule information 35. Identification information to identify the respective users or information such as email addresses of the respective users, for example, is registered as the user information 37. The storage device 33 includes a print job storage region 38 for storing therein the print job received over the network 5. Although the storage device 33 stores therein a variety of programs and information besides the program and information mentioned above, they are not shown in FIG. 7.

The CPU 30 reads and executes the program 36 installed in advance on the storage device 33, thereby becoming operative to function as each processing part described later. The memory 31 stores therein data such as temporary data required in accordance with execution of the program 36 by the CPU 30. The network interface 32 is for connecting the print server 3 to the network 5.

Figure 8:
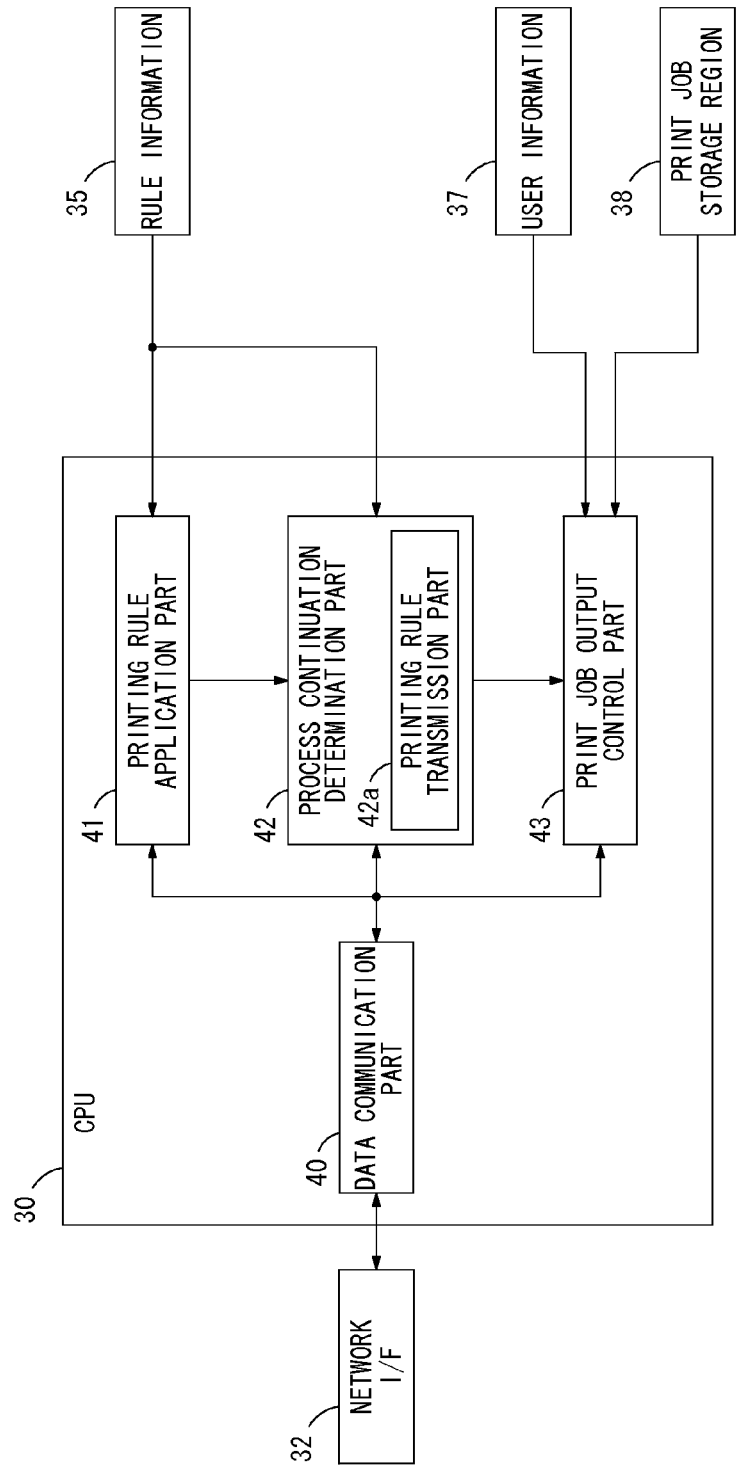
FIG. 8 is a block diagram showing the functional configuration realized on the print server of the first preferred embodiment.

FIG. 8 is a block diagram showing the functional configuration realized by execution of the program 36 by the CPU 30. As the print server 3 is powered on, for instance, the CPU 30 reads and executes the program 36, thereby serving as each processing part of FIG. 8. In detail, the CPU 10 serves as a data communication part 40, a printing rule application part 41, a process continuation determination part 42 and a print job output control part 43. The process continuation determination part 42 of the first preferred embodiment further serves as a printing rule transmission part 42a.

The data communication part 40 establishes data communication with the information processing device 2 and the image forming device 4 via the network interface 32. In response to receipt of the print job from the information processing device 2, the data communication part 40 stores the received print job to the print job storage region 38.

The printing rule application part 41 applies the printing rule to the print job stored in the print job storage region 38 and determines the later process detail on the print job. More specifically, the printing rule application part 41 reads the rule information 35 in the storage device 33 and specifies a printing rule that should be applied to the print job among from the multiple printing rules registered in the rule information 35. The specified printing rule is applied to the print job, so that the printing rule application result is produced and the later process detail on the print job is determined. The later process detail on the print job received by the print server 3 is determined, and the user allowed to take the printed output produced as a result of execution of the print job and/or the image forming device 4, the destination of the print job is determined.

The process continuation determination part 42 determines whether or not to continue the print job process based on the printing rule application result produced by the printing rule application part 41. The printing rule transmission part 42a of the process continuation determination part 42 is put into operation in response to receipt of the request for sending the printing rule from the information processing device 2 by the data communication part 40 to read the rule information 35 in the storage device 33 and send the read rule information 35 to the information processing device 2. The process continuation determination part 42 is capable of causing the printing rule application result to be displayed with the information processing device 2 prior to receipt of the print job by the print server 3. After the printing rule transmission part 42a sends the rule information 35, the process continuation determination part 42 is put into a waiting state for receipt of the print job from the information processing device 2.

After receiving the print job from the information processing device 2 to which the rule information 35 is sent, the process continuation determination part 42 determines that the continuation of the print job process is permitted by the user and decides to proceed with the process detail determined by the printing rule application part 41, sequentially.

In response to the receipt of the print job, the information designating the image forming device 4 to be the destination of the print job by the user or the information identifying the user allowed to take the produced printed output may be received together with the print job. In this case, the process continuation determination part 42 determines the process detail based on such information containing designation by the user. As described above, it is assumed, for example, the "No. 4" printing rule of FIG. 2 is applied to the print job by the printing rule application part 41. In this case, the printing rule application result contains two image forming devices 4 as the destination and two users C and D as the user allowed to take the produced printed output. One of the two image forming devices 4 may be selected or one of the two users C and D may be selected by the user who gave the instruction to send the print job by making operation with the information processing device 2. In such a case, the process continuation determination part 42 determines to proceed with the process after narrowing the destination of the print job or the user allowed to take the produced printed output down.

The print job output control part 43 is put into operation when the process continuation determination part 42 determines to proceed with the print job process. The print job output control part 43 reads the print job in the print job storage region 38 and proceeds with the print job process based on the printing rule application result produced by the printing rule application part 41.

When, for example, the output notification to the user allowed to take the printed output is "required," the print job output control part 43 reads the user information 37 in the storage device 33 and designates the email address of the user allowed to take the printed output. The print job output control part 43 then sends the email EM1 to the designated email address to notify the user that the print job allowing the user to output is stored.

When "authentication output" is configured for the output method, the print job output control part 43 outputs the print job in the print job storage region 38 to the image forming device 4 if the image forming device 4 that is the destination is logged in by the user allowed to take the printed output.

The process detail may be narrowed down by the process continuation determination part 42. In such a case, the print job output control part 43 proceeds with the process within the range narrowed down by the process continuation determination part 42. When the user gives the instruction to send the print job designates to narrow the process detail down within the range of the printing rule application result, the later print job process is proceeded in the range narrowed down with the user's designation on the print control system 1.

Figure 9:
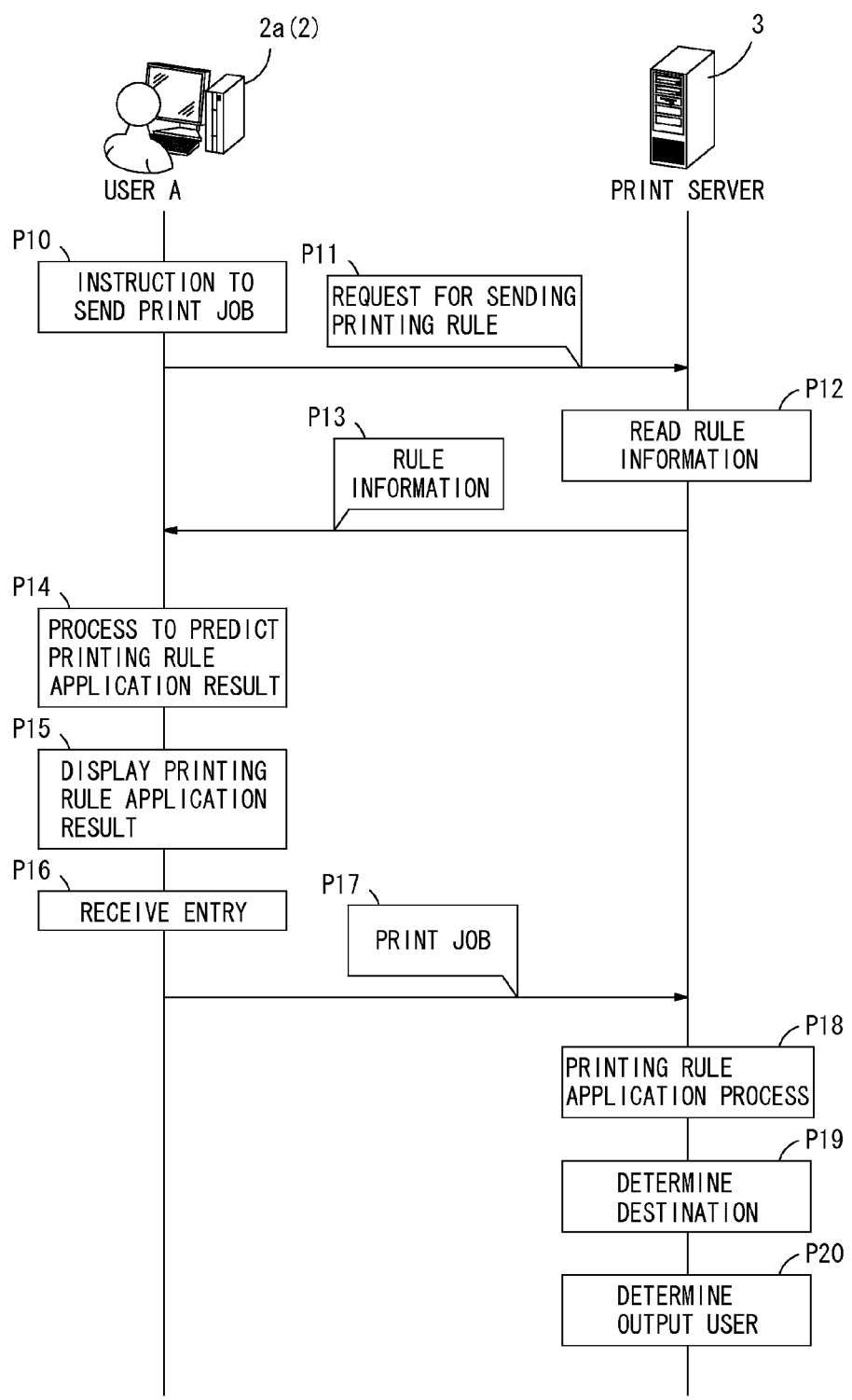
FIG. 9 is a view showing a frame format of a process flow for a user who gives an instruction to send a print job to check a printing rule application result in the first preferred embodiment.

FIG. 9 is a view showing a frame format of a process flow for the user gives the instruction to send the print job to check the printing rule application result in the first preferred embodiment. In the example of FIG. 9, the user A operates the information processing device 2a to give the instruction to send the print job. The user A operates the information processing device 2a to give the instruction to send the print job, for instance (process P10). In response to the instruction to send the print job, the information processing device 2a starts generating the print job, and sends the request for sending the printing rule to the print server 3 (process P11). After receiving the request for sending the printing rule, the print server 3 reads the rule information 35 (process P12) and sends the read rule information 35 to the information processing device 2a (process P13).

As receiving the rule information 35 from the print server 3, the information processing device 2a applies the printing rule to the print job and performs the process to predict the printing rule application result to be produced by the print server 3 before sending the print job to the print server 3 (process P14). The information processing device 2a causes the predictive printing rule application result to be displayed on the display unit 13 (process P15).

Figure 10:
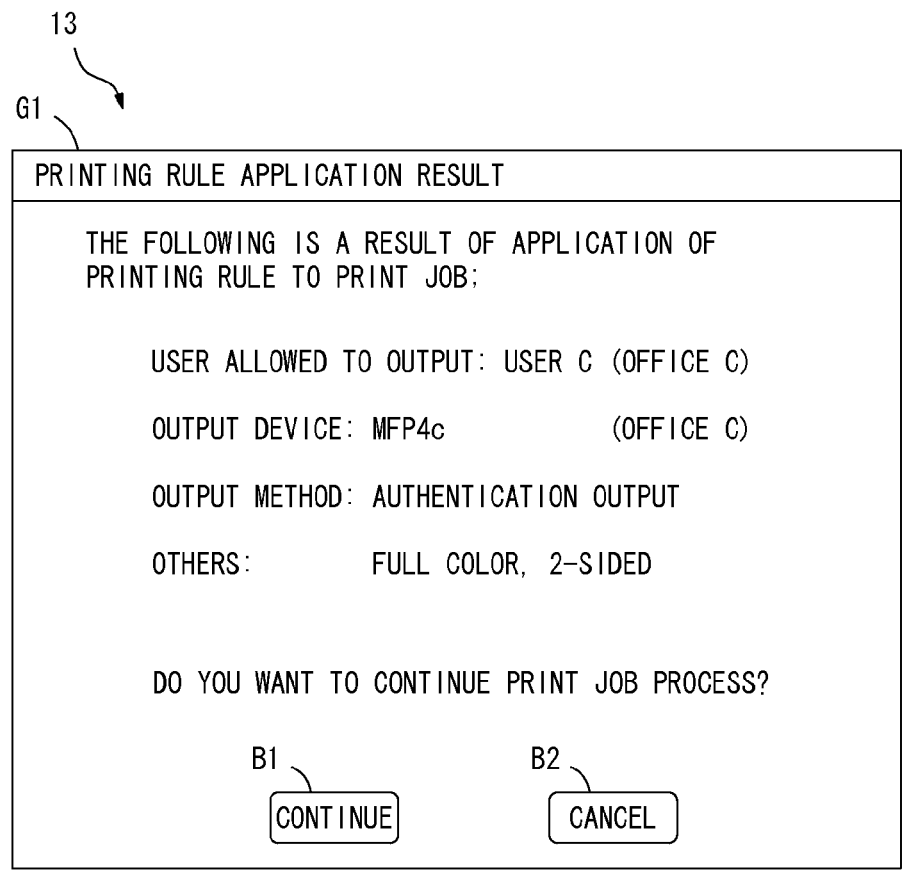
FIG. 10 shows an example of printing rule application result screen image displayed on a display unit of the information processing device.

FIG. 10 shows an example of printing rule application result screen image G1 displayed on the display unit 13. Referring to FIG. 10, the printing rule application result screen image G1 contains the information such as the user name or the office name that the user belongs as the information concerning the user who is allowed to output the print job and take the printed output. The printing rule application result screen image G1 also contains the information such as the name of the image forming device or the office name where the image forming device is installed at as the information relating to the image forming device allowed to output the print job. Information to show which of the authentication output and the autonomic output is performed as the output method is also contained. Further, the printing rule application result screen image G1 contains information as to the print settings applied at execution of the print job if the printing rule includes the print settings. On the printing rule application result screen image G1, a continue button B1 and a cancel button B2 are shown. The continue button B1 is selected by the user to continue the print job process, and the cancel button B2 is selected not to continue after checking the printing rule application result. The plurality of image forming devices 4 or more than one user allowed to take the printed output may be designated with the printing rule application result as described above. In such a case, the screen image G1 is preferably configured as a screen that allows the user A to select the image forming device 4 to be the destination or the user allowed to take the printed output. Such screen image G1 is not shown in FIG. 10.

Referring back to FIG. 9, the information processing device 2a receives the entry by the user A with making the above-described screen image G1 display (process P16). In response to operation to select the continue button B1 to continue the print job process by the user A, the information processing device 2a sends the print job to the print server 3 (process P17). When the cancel button B2 not to continue the print job process is selected by the user A, the process after the process P17 is not performed.

As receiving the print job from the information processing device 2a, the print server 3 applies the printing rule to the received print job and produces the printing rule application result (process P18). The print server 3 then determines the destination of the print job based on the printing rule application result (process P19). The print server 3 also determines the user allowed to output the print job based on the printing rule application result (process P20).

Figure 11:
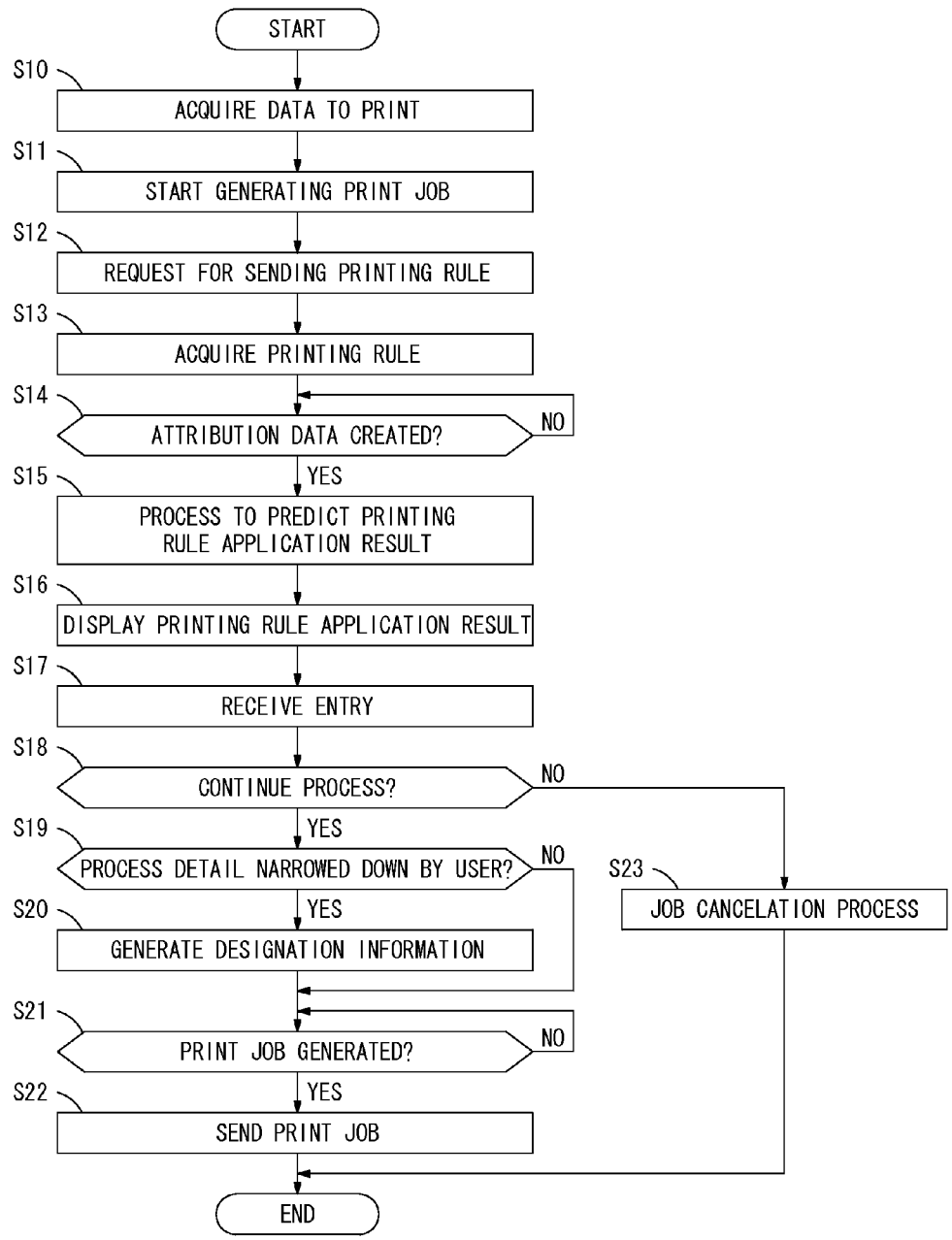
FIG. 11 is a flow diagram explaining an exemplary sequential procedure of the process performed by the information processing device of the first preferred embodiment.

FIG. 11 is a flow diagram explaining an exemplary sequential procedure of the process performed by the information processing device 2 of the first preferred embodiment. The process of FIG. 11 is started in response to the instruction to send the print job by the user of the information processing device 2, for example. Upon the start of the process, the information processing device 2 acquires the data to print (step S10) and starts generating the print job (step S11). The information processing device 2 sends the request for sending the printing rule to the print server 3 (step S12). The information processing device 2 then acquires the rule information 35 from the print server 3 (step S13). After step S13, the information processing device 2 determines whether or not the creation of the attribution data D1 contained in the print job is complete and is put into the waiting state until the attribution data D1 is created (step S14).

After the creation of the attribution data D1 is complete (when a result of step S14 is YES), the information processing device 2 specifies the printing rule to apply to the print job among from the multiple printing rules registered as the rule information 35 based on the created attribution data D1. The information processing device 2 applies the specified printing rule to the print job and produces the printing rule application result (step S15). The printing rule application result thereby produced is the forecast that predicts the result to be produced by the print server 3. The information processing device 2 causes the printing rule application result to be displayed on the display unit 13 (step S16) and makes the user gave the instruction to send the print job check. The information processing device 2 receives the user's entry (step S17) and determines whether or not to continue the print job process (step S18).

In response to the instruction by the user to permit the continuation of the print job process (when a result of step S18 is YES), the information processing device 2 determines whether or not the process detail is narrowed down within the range of the printing rule application result by the user (step S19). When the process detail is narrowed down with the user's operation, the designation information is generated based on the narrowed down process detail (step S20). The designation information is sent to the print server 3 with the print job when the print job is sent. When the process detail is not narrowed down with the user's operation, the process in step S20 is skipped, so that the designation information is not generated.

The information processing device 2 is put into the waiting state until the drawing data D2 is created and the print job is generated (step S21). After the print job is generated, the print job is sent to the print server 3 (step S22).

When the instruction to refuse the continuation of the print job process is given by the user who has checked the printing rule application result (when a result of step S18 is NO), the information processing device 2 cancels the whole process relating to the print job to make the process terminate. In such a case, the print job is not sent to the print server 3.

Figure 12:
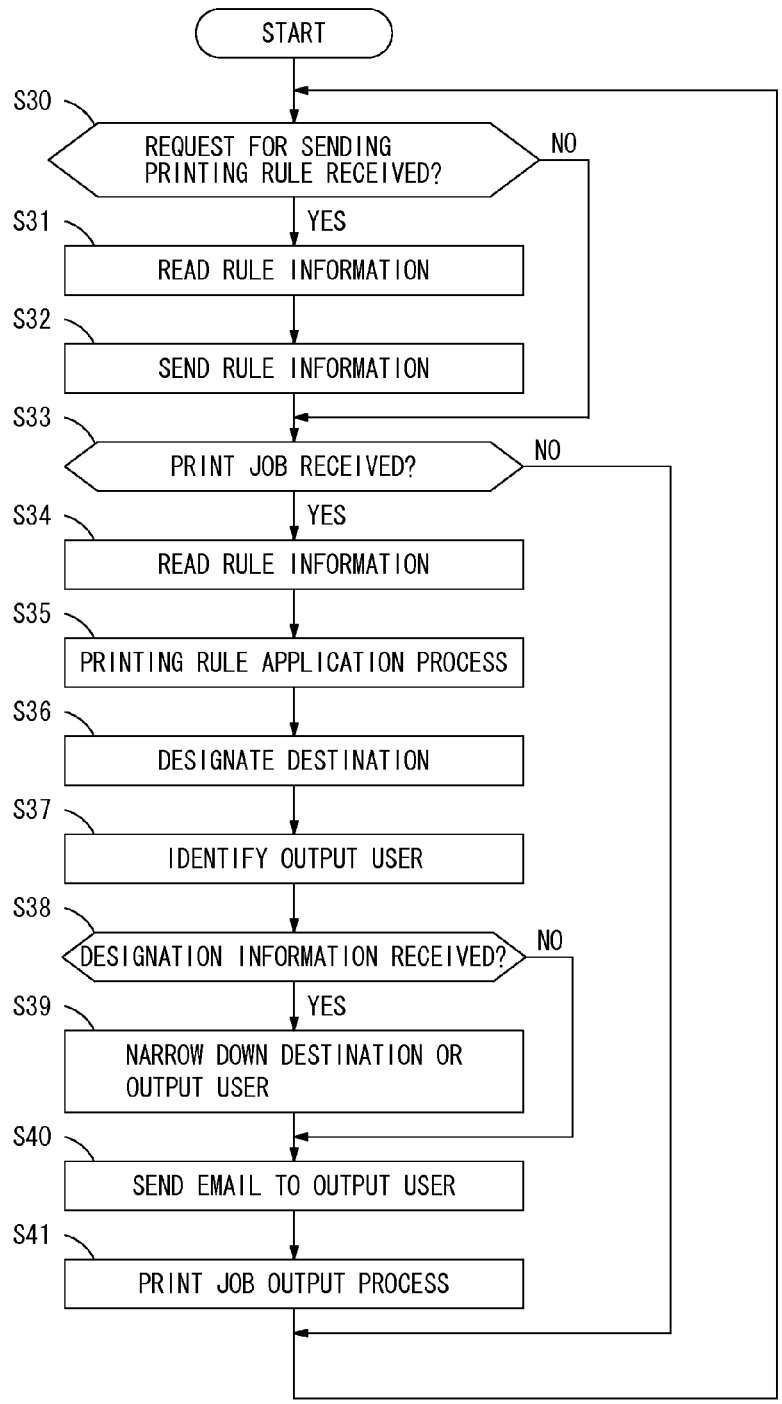
FIG. 12 is a flow diagram explaining an exemplary sequential procedure of the process performed by the print server of the first preferred embodiment.

FIG. 12 is a flow diagram explaining an exemplary sequential procedure of the process performed by the print server 3 of the first preferred embodiment. The process of FIG. 12 is started as the print server 3 is powered on, for example. The process is repeatedly performed while the print server 3 is running.

Upon the start of the process, the print server 3 determines whether or not the request for sending the printing rule is received from the information processing device 2 (step S30). When the request for sending the printing rule has been received (when a result of step S30 is YES), the print server 3 reads the rule information 35 in the storage device 33 (step S31) and sends the read rule information 35 to the information processing device 2 (step S32). When the request for sending the printing rule is not received (when a result of step S30 is NO), the print server 3 moves on to step S33 without performing the process in step S31 and S32.

The print server 3 determines whether or not the print job is received from the information processing device 2 (step S33). In response to the receipt of the print job (when a result of step S33 is YES), the print server 3 stores the print job in the print job storage region 38 and reads the rule information 35 in the storage device 33 (step S34). The print server 3 specifies the printing rule to apply to the print job among from the multiple printing rules registered as the rule information 35 based on the received print job and applies the specified printing rule to the print job (step S35). As a result, the printing rule application result is produced. The print server 3 then designates the destination of the print job (step S36) and identifies the user allowed to take the printed output based on the printing rule application result (step S37).

The print server 3 determines whether or not the designation information is received with the print job (step S38). With receipt of the designation information (when a result of step S38 is YES), the print server 3 narrows the destination of the print job designated in step S36 or the user allowed to take the printed output identified in step S37 down based on the designation information (step S39). When the designation information is not received (when a result of step S38 is NO), the print server 3 does not narrow the destination or the user down as described above and confirms the print job process detail designated based on the printing rule application information.

The print server 3 then sends the email notifying that the print job is stored to the user allowed to take the printed output based on the printing rule application result (step S40). The process in step S40 is not performed when the printing rule applied to the print job defines that the output notification is "not required."

The print server 3 outputs the print job stored in the print job storage region 38 to the image forming device 4 designated as the destination (step S41). The printed output is produced in the output method defined by the printing rule applied to the print job. To be more specific, with "automatic output" defined, the print server 3 reads the print job in the print job storage region 38 and sends the read print job to the image forming device 4, the destination without waiting for the user allowed to take the printed output to log into the image forming device 4, the destination. According to the printing rule defining "authentication output," the print server 3 is put into the waiting state for the user allowed to take the printed output to log into the image forming device 4, the destination. As the image forming device 4, the destination is logged-in by the user allowed to take the printed output, the print server 3 reads the print job in the print job storage region 38 and sends the read printed job based on the user's instruction.

Without the print job received (when a result of step S33 is NO), the print server 3 does not perform the process in step S34 to S41.

On the print control system 1 of the first preferred embodiment, the information processing device 2 is configured to acquire the rule information 35 from the print server 3 to produce the printing rule application result and make the user who gave the instruction to send the print job check the produced printing rule application result before the process according to the printing rule for the print job received from the information processing device 2 is performed by the print server 3. The user who gave the instruction to send the print job may check how the printed output is produced responsive to the print job before the printed output is actually produced. The user who gave the instruction to send the print job is allowed to check in advance the printing rule application result and determine whether to continue or cancel the process relating to the print job. It, therefore, may prevent the occurrence of the printed output unexpected to the user, resulting in security improvement.

The information processing device 2 of the first preferred embodiment is capable of making the user who gave the instruction to send the print job check the printing rule application result without sending the print job to the print server 3. If, for example, the user cancels the process, the process may be terminated without sending the print job. The print job having a large amount of data containing the drawing data D2 is not output over the network 5. This may control the increase in the load on the network 5. Also, operation load on the print server 3 may be lightened as the print server 3 is not required to apply the printing rule.

According to the first preferred embodiment, responsive to the generation of the print job by the information processing device 2, the printing rule application result is displayed on the display unit 13 to make the user check the displayed printing rule application result. The user may feel bothersome to check the printing rule application result every time it is generated if he or she is required to. In order to lighten the operation load on the user for checking, it is allowed to determine whether or not to cause the printing rule application result produced in response to application of the printing rule to be displayed on the display unit 13 depending, for example, on the printing rule applied to the print job or based on if the data to print contains the confidential information.

The information processing device 2 produces the printing rule application result by applying the printing rule to the print job. The information processing device 2 then, for example, determines whether or not the user who gave the instruction to send the print job and the user allowed to take the printed output produced in response to the execution of the print job are the same user. As a result of the determination, the user who gave the instruction to send the print job and the user allowed to take the printed output produced in response to the execution of the print job may be the different users. In such a case, the information processing device 2 may cause the printing rule application result to be displayed on the display unit 13. If those users are the same, the printing rule application result is not necessary to be checked. So, the operation load on the user may be lightened. If the user who gave the instruction to send the print job and the user allowed to take the printed output are the same user, the printing rule application result is not checked, but the compromise of the security may be controlled.

After producing the printing rule application result by applying the printing rule to the print job, the information processing device 2 may determine whether the network address of the image forming device 4 to be the destination is different from the network address of the network 5 to which the information processing device 2 is connected. When the network addresses are the same, the printed output is produced at the office where the user is at. So, the user who gave the instruction to send the print job may know that the printed output is produced with which image forming device 4. When the network addresses are not the same, the printed output is produced at the office different from the user's office. The user who gave the instruction to send the print job may not know where the printed output is at. The information processing device 2 makes the above-mentioned determination. Responsive to the determination, the information processing device 2 may cause the printing rule application result to be displayed on the display unit 13 if the destination of the print job according to the printing rule application result is the network address of the image forming device 4 different from the network address of the network 5 to which the information processing device 2 is connected. If the network addresses are the same, the printing rule application result is not necessary to be checked. So, the operation load on the user may be lightened. If the network addresses are the same, the printing rule application result is not checked, but the compromise of the security may be controlled.

Further, the information processing device 2 may determine if the data such as the document specified as the data to print contains the confidential information. The information processing device 2 may cause the printing rule application result to be displayed on the display unit 13 when the data to print contains the confidential information. If the data to print contains no confidential information, the printing rule application result is not necessary to be checked. So, the operation load on the user may be lightened. If no confidential information is contained, the printing rule application result is not checked, but the compromise of the security may be controlled.

Examples of three patters of skipping the check operation of the printing rule application result are described above. The check operation of the printing rule application result may also be skipped in other patterns. The user of the information processing device 2, for example, may set in advance with the information processing device 2 whether or not to display the printing rule application result. When the printing rule application result is set by the user not to be displayed, the information processing device 2 basically sends the print job to the print server 3 without making the user check the printing rule application result.

The compromise of the security should be controlled in the above-described example. The printing rule application result is produced by the information processing device 2 and the destination of the print job may be the image forming device 4 having the network address, the same address as the one of the information processing device 2. The user taking the printed output and the user who gave the instruction to send the print job may be the same user. Or rather, the data to print may contain no confidential information. In such cases, therefore, the print job is preferably sent to the print server 3 without making the printing rule application result display not to have compromise of the security. More specifically, when the destination of the print job is the image forming device 4 having the network address different from the address of the information processing device 2, the user taking the printed output and the user who gave the instruction to send the print job are the different users, or rather, the data to print contains the confidential information, the information processing device 2 is preferably configured to cause the printing rule application result to be displayed and make the user check the printing rule application result even if it is set by the user not to display the printing rule application result.

(Second Preferred Embodiment)

A second preferred embodiment is described next. The hardware configurations of the information processing device 2 and the print server 3 of the second preferred embodiment are the same as those of the first preferred embodiment.

Figure 13:
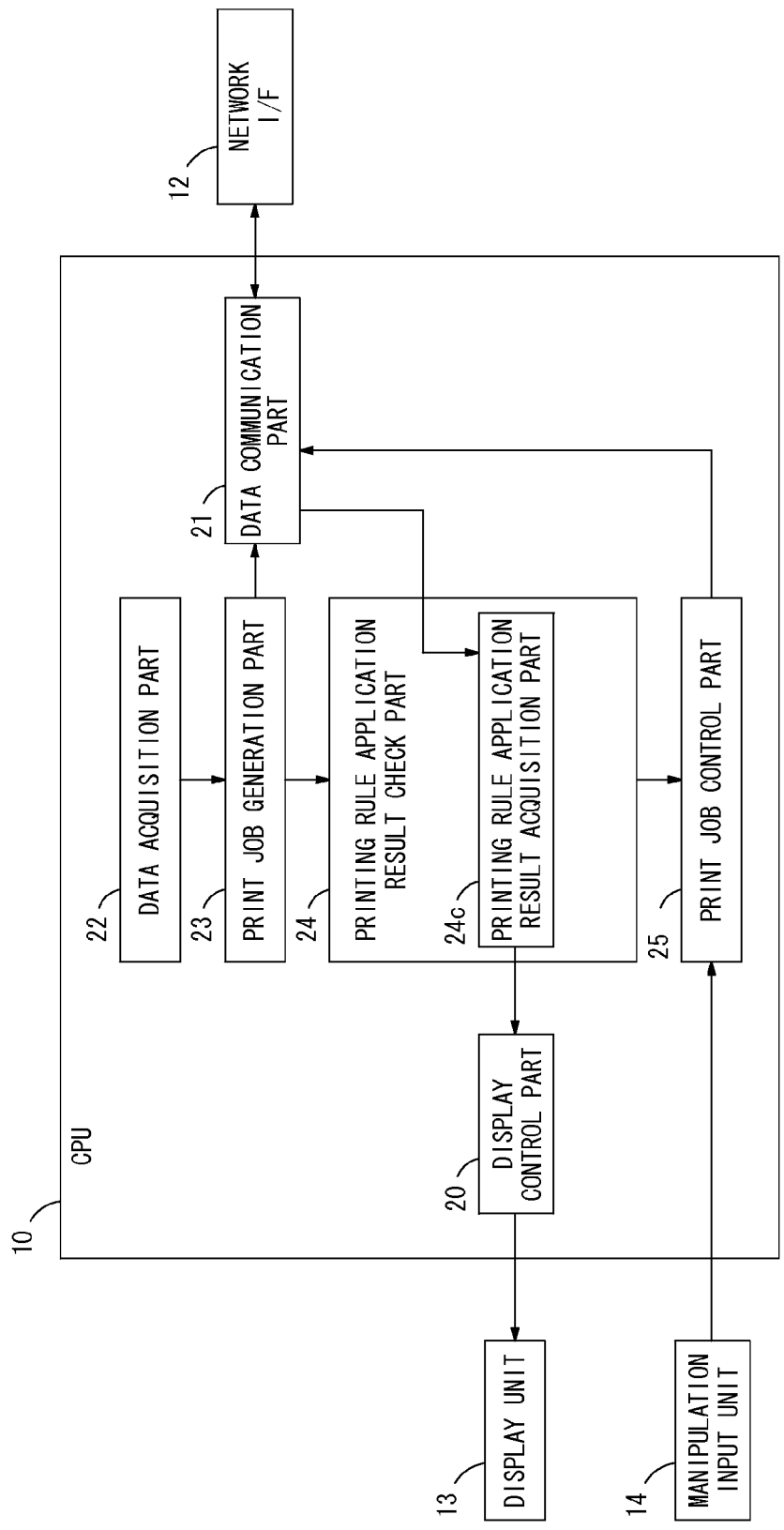
FIG. 13 is a block diagram showing the functional configuration realized on the information processing device of a second preferred embodiment.
Figure 14:
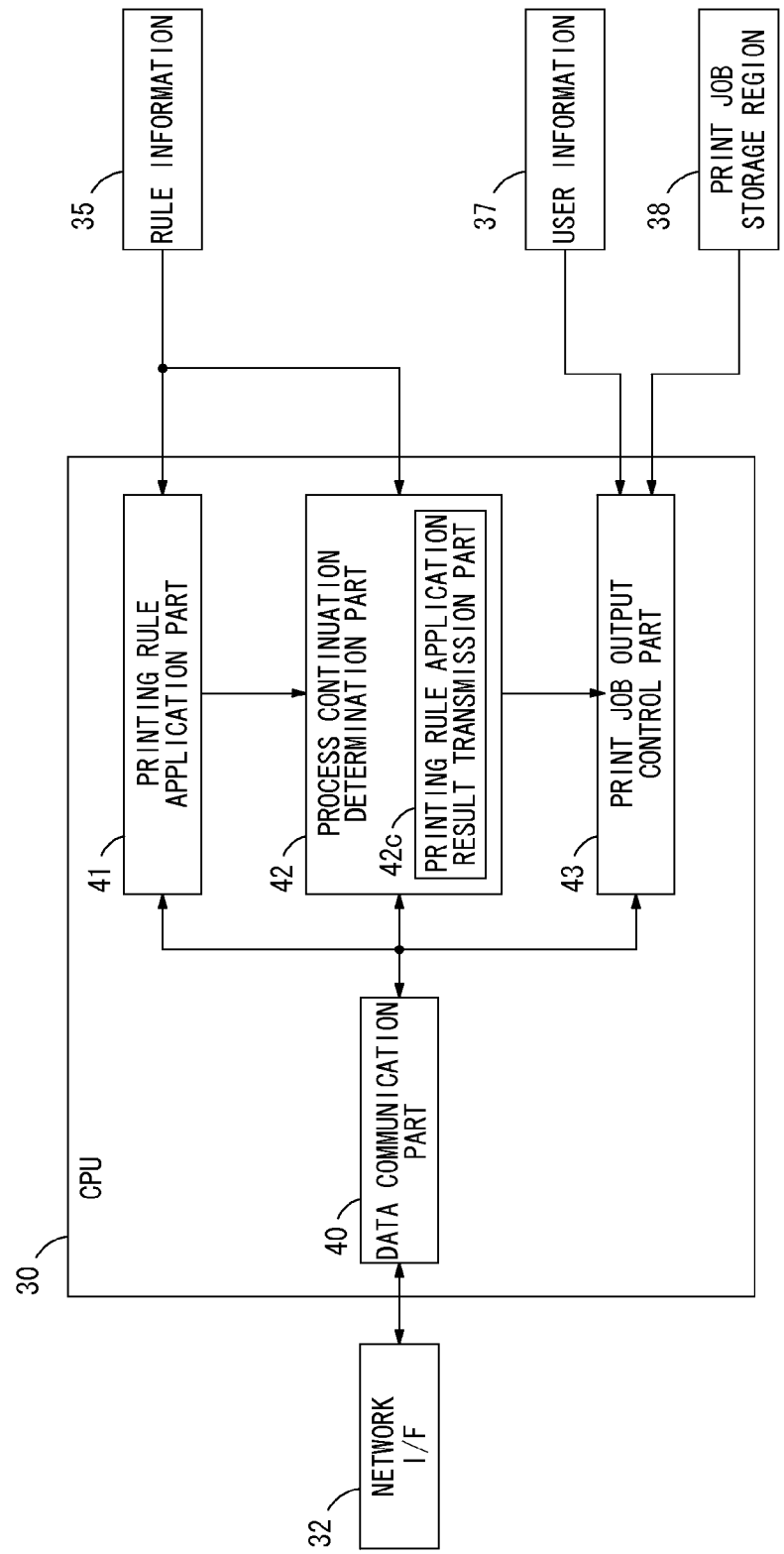
FIG. 14 is a block diagram showing the functional configuration realized on the print server of the second preferred embodiment.

FIG. 13 is a block diagram showing the functional configuration realized by execution of the program 17 by the CPU 10 on the information processing device 2 of the second preferred embodiment. FIG. 14 is a block diagram showing the functional configuration realized by execution of the program 36 by the CPU 30 on the print server 3 of the second preferred embodiment.

As the data acquisition part 22 acquires the data to print, the information processing device 2 puts the print job generation part 23 into operation as illustrated in FIG. 13. The print job generation part 23 starts generating the print job based on the data to print acquired by the data acquisition part 22. Through the print job generation process, the print job generation part 23 outputs the attribution data D1 to the data communication part 21 after creating the attribution data D1 and then outputs the drawing data D2 to the data communication part 21 after creating the drawing data D2. In response to the input of the attribution data D1 from the print job generation part 23, the data communication part 21 sends the attribution data D1 to the print server 3 via the network interface 12 at first. As inputting the drawing data D2 from the print job generation part 23 after sending the attribution data D1, the data communication part 21 sends the print job containing the input drawing data D2 to the print server 3 at next. According to the second preferred embodiment, responsive to the generation of the print job by the print job generation part 23, the data communication part 21 immediately sends the generated print job to the print server 3.

The print server 3 receives the print job from the information processing device 2 as described above. Referring to FIG. 14, after receiving the print job from the information processing device 2, the data communication part 40 stores the received print job in the print job storage region 38. The print server 3 of the second preferred embodiment separately receives the attribution data D1 prior to receipt of the whole print job. The printing rule application part 41, therefore, is capable of starting the printing rule application process based on the attribution data D1 which is received prior to the whole print job.

To be more specific, responsive to the receipt of the attribution data D1, the printing rule application part 41 reads the rule information 35 in the storage device 33 and specifies the printing rule to apply to the print job among from the multiple printing rules registered as the rule information 35. The printing rule application part 41 applies the specified printing rule to the print job, thereby producing the printing rule application result.

As illustrated in FIG. 14, the process continuation determination part 42 includes a printing rule application result transmission part 42*c*. The printing rule application result transmission part 42*c* is put into operation to function as the printing rule application result is produced by the printing rule application part 41. The printing rule application result transmission part 42*c* is put into operation to send the produced printing rule application result to the information processing device 2. After the printing rule application result is sent, the process continuation determination part 42 is put into the waiting state until acquiring the information as to whether or not to continue the print job process from the information processing device 2. The print server 3 of the second preferred embodiment produces the printing rule application result responsive to the receipt of the print job from the information processing device 2. The print server 3 then sends the produced printing rule application result to the information processing device 2 and is put into the waiting state for the instruction from the information processing device 2. During the waiting state, the print job process is not proceeded.

On the other hand, after sending the print job to the print server 3, the information processing device 2 puts the printing rule application result check part 24 of FIG. 13 into operation. The printing rule application result check part 24 includes a printing rule application result acquisition part 24*c*. The printing rule application result acquisition part 24*c* acquires the printing rule application result from the print server 3 and outputs the acquired printing rule application result to the display control part 20. Thus, the printing rule application result produced by the print server 3 is displayed on the display unit 13. The user who gave the instruction to send the print job is allowed to check the result of application of the printing rule to the print job and determine whether or not to continue the process relating to the print job.

As well as the first preferred embodiment, the information processing device 2 receives the instruction to continue or cancel the process relating to the print job and outputs the received instruction to the print job control part 25. The print job control part 25 sends the information as to whether or not to continue the print job process to the print server 3 based on the user's instruction entered through the manipulation input unit 14. To be more specific, when the instruction to refuse the continuation of the process relating to the print job is entered by the user, the print job control part 25 sends an instruction to cancel the later process relating to the print job to the print server 3 and makes the print job process terminate. When, on the other hand, the instruction to permit the continuation of the print job process is entered, the print job control part 25 sends the instruction to continue the later process relating to the print job to the print server 3.

The process continuation determination part 42 in the waiting state in the print server 3 receives the instruction to continue or cancel the process from the information processing device 2. After receiving the instruction, the process continuation determination part 42 determines the process detail and decides whether or not to continue the print job process relating to the print job. The print job output control part 43 is put into operation when the process continuation determination part 42 decides to proceed with the print job process. The print job output control part 43 reads the print job in the print job storage region 38 and outputs the read print job to the image forming device 4 based on the printing rule application result. As described in the first preferred embodiment, the process detail may be narrowed down within the range of the printing rule application result. In such a case, the print job output control part 43 proceeds with the process based on the designation made by the user. For cancelling the print job process, the process continuation determination part 42 deletes the print job stored in the print job storage region 38.

Figure 15:
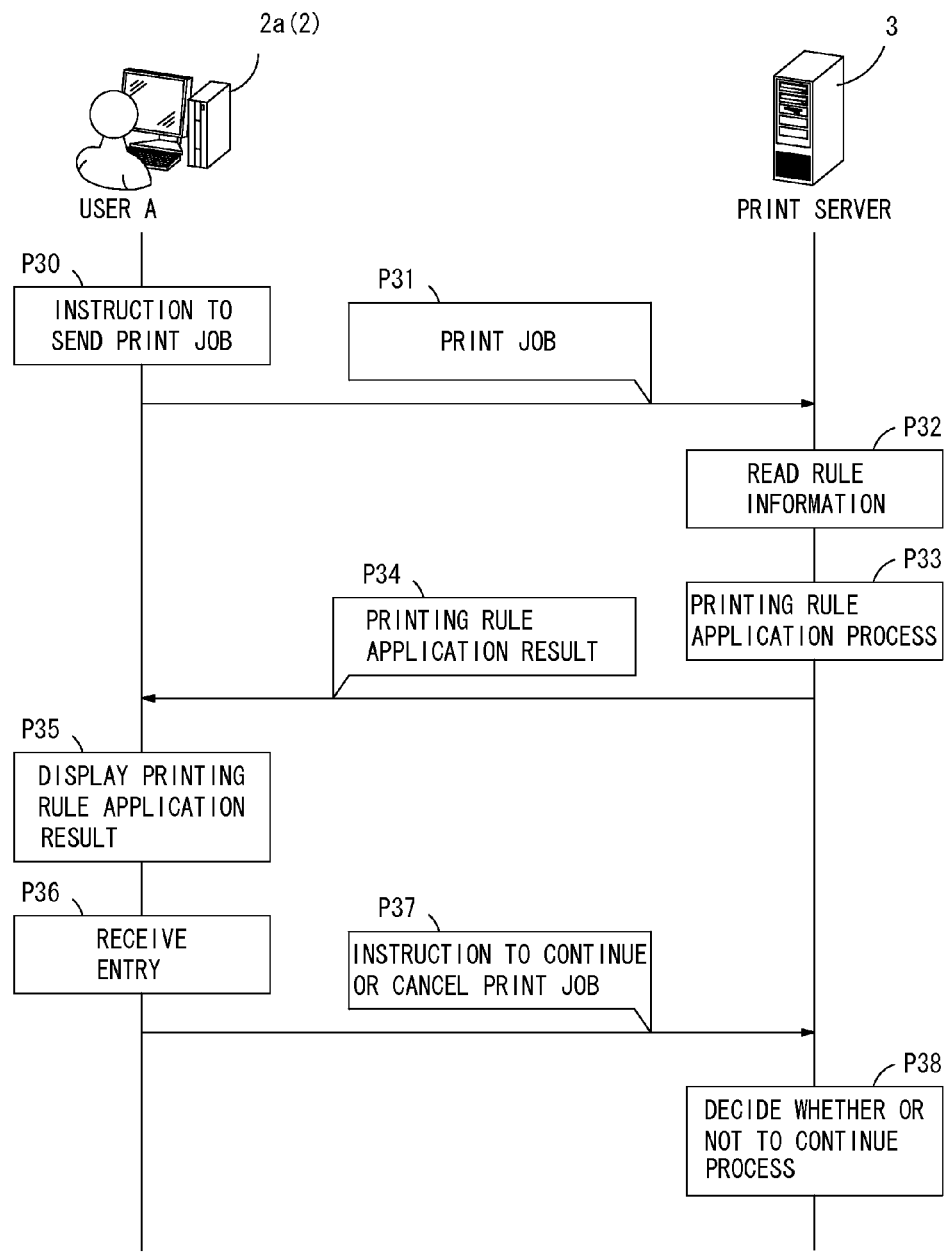
FIG. 15 is a view showing a frame format of a process flow for the user who gives the instruction to send the print job to check the printing rule application result in the second preferred embodiment.

FIG. 15 is a view showing a frame format of a process flow for the user who gives the instruction to send the print job to check the printing rule application result in the second preferred embodiment. In the example of FIG. 15, the user A operates the information processing device 2*a* to give the instruction to send the print job. The user A operates the information processing device 2*a* to give the instruction to send the print job at first, for instance (process P30). In response to the instruction to send the print job, the information processing device 2*a* starts generating the print job, and sends the generated print job to the print server 3 (process P31). After receiving the print job, the print server 3 reads the rule information 35 (process P32). The print server 3 applies the printing rule to the print job based on the read rule information 35 and produces the printing rule application result (process P33). The print server 3 then sends the produced printing rule application result to the information processing device 2*a* (process P34).

As receiving the printing rule application result from the print server 3, the information processing device 2*a* causes the printing rule application result to be displayed on the display unit 13 (process P35). The display screen image thereby displayed is the same as the one of FIG. 10. The information processing device 2*a* receives the entry by the user with the display screen image being displayed (process P36). The information processing device 2*a* sends the instruction to continue or cancel the print job process to the print server 3 based on the user A's instruction (process P37).

As receiving the instruction from the information processing device 2*a*, the print server 3 determines the instruction to decide whether or not to continue the print job process (process P38). The print server 3 may receive the entry by the user A with the screen image G1 of FIG. 10 being displayed. As the operation to select the continue button B1 to continue the print job process is made by the user A in such a case, the print server 3 determines to proceed with the process relating to the print job stored in the print job storage region 38. When the cancel button B2 not to continue the print job process is selected by the user A, the print server 3 deletes print job stored in the print job storage region 38 and makes the process terminate.

Figure 16:
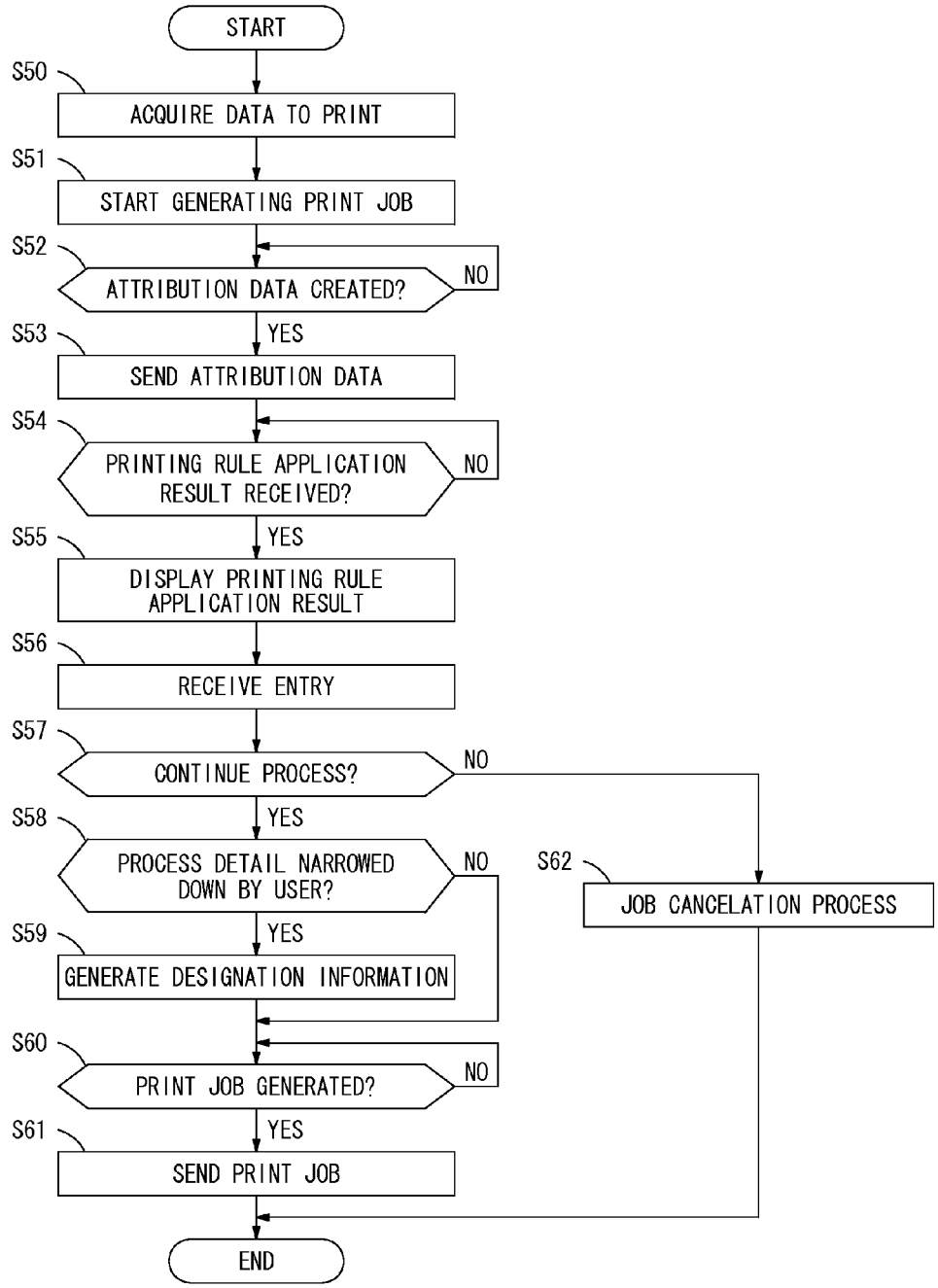
FIG. 16 is a flow diagram explaining an exemplary sequential procedure of the process performed by the information processing device of the second preferred embodiment.

FIG. 16 is a flow diagram explaining an exemplary sequential procedure of the process performed by the information processing device 2 of the second preferred embodiment. The process of FIG. 16 is started after the instruction to send the print job is given by the user of the information processing device 2, for example. Upon the start of the process, the information processing device 2 acquires the data to print (step S50) and starts generating the print job (step S51). The information processing device 2 is put into the waiting state until the creation of the attribution data D1 is complete (step S52). The information processing device 2 then sends the attribution data D1 to the print server 3 at a time the attribution data D1 is created (step S53). After step S53, the information processing device 2 is put into the state waiting for the receipt of the printing rule application result from the print server 3 (step S54). After receiving the printing rule application result (when a result of step S54 is YES), the information processing device 2 causes the printing rule application result to be displayed on the display unit 13 (step S55). This enables the user who gave the instruction to send the print job to check the printing rule application result. The information processing device 2 then receives the entry by the user (step S56) and determines whether or not to continue the process relating to the print job (step S57).

In response to the entry by the user of the instruction to permit the continuation of the print job process (when a result of step S57 is YES), the information processing device 2 determines whether or not the process detail is narrowed down within the range of the printing rule application result by the user (step S58). When the process detail is narrowed down by the user, the designation information is generated based on the narrowed down process detail (step S59). When the process detail is not narrowed down by the user, the process in step S59 is skipped, so that the designation information is not generated.

The information processing device 2 is put into the waiting state until the drawing data D2 is created and the print job is generated (step S60). After the print job is generated, the print job is sent to the print server 3 (step S61). If the print job has already been sent to the print server 3 at the time of step S61, the instruction to proceed with the print job process is sent instead. When the designation information is generated in step S59, the designation information is sent to the print server 3.

When the instruction to refuse the continuation of the print job process is given by the user who checked the printing rule application result (when a result of step S57 is NO), the information processing device 2 cancels the whole process relating to the print job and the process is terminated. If the print job has already been sent in such a case, the instruction to interrupt and terminate the print job process is sent to the print server 3.

Figure 17:
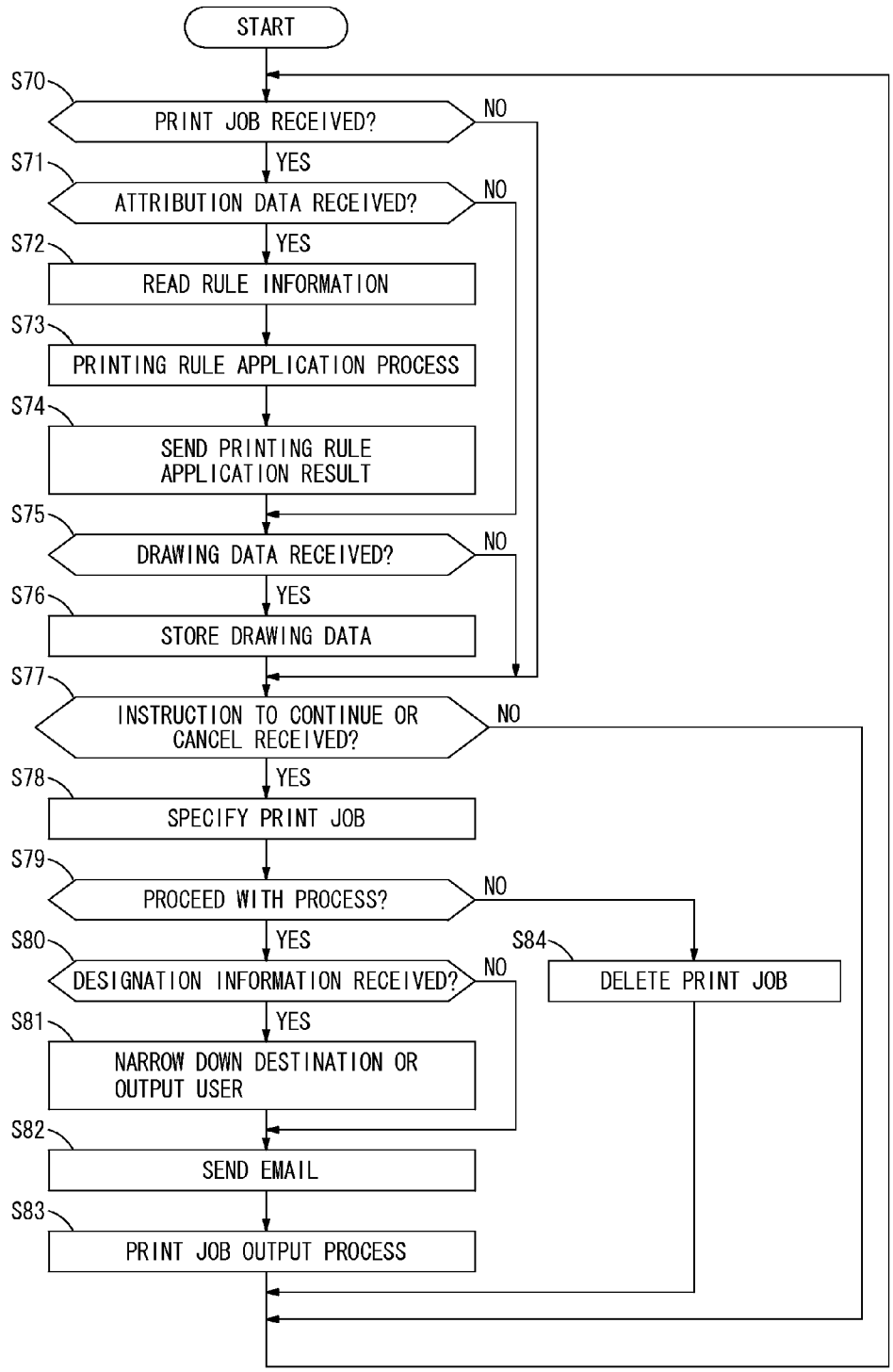
FIG. 17 is a flow diagram explaining an exemplary sequential procedure of the process performed by the print server of the second preferred embodiment.

FIG. 17 is a flow diagram explaining an exemplary sequential procedure of the process performed by the print server 3 of the second preferred embodiment. The process of FIG. 17 is started as the print server 3 is powered on, for example. The process is repeatedly performed while the print server 3 is running.

Upon the start of the process, the print server 3 determines whether or not the print job is received from the information processing device 2 (step S70). When the print job is received (when a result of step S70 is YES), the print server 3 further determines if the received print job is the attribution data D1 (step S71).

If the received print job is the attribution data D1 (when a result of step S71 is YES), the print server 3 reads the rule information 35 in the storage device 33 (step S72). The print server 3 specifies the printing rule to apply to the print job among from the multiple printing rules registered as the rule information 35 based on the received attribution data D1. The print server 3 then applies the specified printing rule to the print job to produce the printing rule application result (step S73). The print server 3 sends the produced printing rule application result to the information processing device 2 (step S74). The print server 3 determines if the received print job contains the drawing data D2 (step S75). As the drawing data D2 is contained, the received print job is stored in the print job storage region 38 (step S76).

The print server 3 determines whether or not the instruction to continue or cancel the process relating to the print job is received from the information processing device 2 next (step S77). Responsive to receipt of the instruction to continue or cancel the print job process (when a result of step S77 is YES), the print server 3 specifies the print job corresponds to the instruction (step S78) and determines whether or not to proceed with the process (step S79).

In the case where the print server 3 determines to proceed with the process (when a result of step S79 is YES), the print server 3 determines whether or not the designation information is received with the instruction to continue or cancel the print job process (step S80). With receipt of the designation information (when a result of step S80 is YES), the print server 3 narrows the destination of the print job or the user allowed to take the printed output identified with the printing rule application result produced in step S73 down based on the designation information (step S81). When no designation information is received (when a result of step S80 is NO), the print server 3 does not narrow the destination or the user down as described above and confirms the print job process detail based on the printing rule application information produced in step S73. The print server 3 then sends the email notifying that the print job is stored to the user allowed to take the printed output based on the printing rule application result produced in step S73 (step S82). The process in step S82 is not performed when the printing rule applied to the print job defines that the output notification is "not required."

The print server 3 outputs the print job stored in the print job storage region 38 to the image forming device 4 designated as the destination (step S83). The printed output is produced in the output method defined by the printing rule applied to the print job. To be more specific, with "automatic output" defined for the output method, the print server 3 reads the print job in the print job storage region 38 and sends the read print job to the image forming device 4, the destination without waiting for the user allowed to take the printed output to log into the image forming device 4, the destination. According to the printing rule defining "authentication output" for the output method, the print server 3 is put into the waiting state for the user allowed to take the printed output to log into the image forming device 4, the destination. As the image forming device 4, the destination is logged-in by the user allowed to take the printed output, the print server 3 reads the print job in the print job storage region 38 and sends the read print job based on the user's instruction.

As the determining to cancel the process (when a result of step S79 is NO), the print server 3 deletes the print job stored in the print job storage region 38 and cancels the process specified based on the printing rule application result (step S84). If the user gave the instruction to send the print job refuses the continuation of the process based on the printing rule application result, the print server 3 cancels the print job.

Without the instruction to continue or cancel the print job process received from the information processing device 2 (when a result of step S77 is NO), the print server 3 skips the process in step S78 to S84 and repeatedly performs the process from step S70.

As well as the first preferred embodiment, on the print control system 1 of the second preferred embodiment, the information processing device 2 is configured to cause the printing rule application result for the print job to be displayed and make the user who gave the instruction to send the print job check the displayed printing rule application result before the process according to the printing rule for the print job received from the information processing device 2 is performed by the print server 3. The user who gave the instruction to send the print job may check how the printed output is produced responsive to the print job before the printed output is actually produced. The user who gave the instruction to send the print job is allowed to check in advance the printing rule application result and determine whether to continue or cancel the process relating to the print job. It, therefore, may prevent the occurrence of the printed output unexpected to the user, resulting in security improvement.

The information processing device 2 of the second preferred embodiment is capable of acquiring the printing rule application result produced in response to execution of the process to actually apply the printing rule by the print server 3 and making the user who gave the instruction to send the print job check the printing rule application result thereby produced after sending the print job to the print server 3. The second preferred embodiment enables the user to check the result produced by applying the printing rule to the print job by the print server 3. In the above-described first preferred embodiment, the information processing device 2 is configured to acquire the rule information 35 from the print server 3 and predict the printing rule application result that will be produced by the print server 3. So, the rule information 35 may be updated as the new printing rule is registered with the print server 3 after the information processing device 2 acquired the rule information 35 from the print server 3. In such a case, according to the above-described first preferred embodiment, the printing rule application result may not be produced with the latest printing rule. In the second preferred embodiment, however, the information processing device 2 acquires the printing rule application result actually produced by the print server 3 based on the print job and causes the acquired printing rule application result to be displayed. The printing rule application result, therefore, produced with the latest printing rule may be displayed and the user is made check the displayed printing rule application result.

According to the second preferred embodiment, after generating the print job, the information processing device 2 sends only the attribution data D1 to the print server 3 in first as the creation of the attribution data D1 is terminate. The print server 3 receives only the attribution data D1 in first before receiving the whole print job. The print server 3 reads the rule information 35 and starts the process to produce the printing rule application result in response to the receipt of the attribution data D1. The print server 3 is allowed to produce the printing rule application result and send the produced printing rule application result immediately to the information processing device 2. Also, the information processing device 2 is allowed to make the user soon check the printing rule application result.

In the second preferred embodiment, as described above, responsive to the generation of the print job by the information processing device 2, the print server 3 produces the printing rule application result and sends the produced printing rule application result to the information processing device 2, thereby making the user who gave the instruction to send the print job check. The user may feel bothersome to check the printing rule application result every time it is generated by the information processing device 2 if he or she is required to. In order to lighten the operation load on the user for checking, the print server 3 of the second preferred embodiment may be configured to determine whether or not to cause the printing rule application result produced in response to application of the printing rule to be displayed with the information processing device 2 depending, for example, on the printing rule applied to the print job or based on if the data to print contains the confidential information as well as the first preferred embodiment.

The print server 3 produces the printing rule application result by applying the printing rule to the print job. The print server 3 then, for example, determines whether or not the user who gave the instruction to send the print job is the same user as the user allowed to take the printed output produced in response to the execution of the print job. As a result of the determination, the user who gave the instruction to send the print job and the user allowed to take the printed output produced in response to the execution of the print job may be the different users. In such a case, the print server 3 may send the printing rule application result to the information processing device 2. If those users are the same, the printing rule application result is not necessary to be checked. So, the operation load on the user may be lightened. If the user who gave the instruction to send the print job is the same as the user allowed to take the printed output are the same user, the printing rule application result is not checked, but the compromise of the security may be controlled.

After producing the printing rule application result by applying the printing rule to the print job, the print server 3 may determine whether the network address of the image forming device 4 to be the destination is different from the network address of the information processing device 2 from which the print job is received. When the network addresses are the same, the printed output is produced at the office where the user who gave the instruction to send the print job is at. So, the user who gave the instruction to send the print job may know that the printed output is produced with which image forming device 4. When the network addresses are not the same, the printed output is produced at the office different from the office where the user who gave the instruction to send the print job is at. The user who gave the instruction to send the print job may not know where the produced printed output is at. The print server 3 makes the above-mentioned determination. Responsive to the determination, the print server 3 may send the printing rule application result to the information processing device 2 and make the user who gave the instruction to send the print job check the result if the destination of the print job according to the printing rule application result is the image forming device 4 having the network address different from the one of the information processing device 2. If the network addresses are the same, the printing rule application result is not necessary to be checked. So, the operation load on the user may be lightened. If the network addresses are the same, the printing rule application result is not checked, but the compromise of the security may be controlled.

Further, the print server 3 may determine if the data such as the document specified as the data to print contains the confidential information based on the attribution data D1. The print server 3 may send the printing rule application result produced in response to the application of the printing rule to the print job to the information processing device 2 and make the user check the result when the data to print contains the confidential information. If the data to print contains no confidential information, the printing rule application result is not necessary to be checked. So, the operation load on the user may be lightened. If no confidential information is contained, the printing rule application result is not checked, but the compromise of the security may be controlled.

Examples of three patters of skipping the check operation of the printing rule application result are described above. The check operation of the printing rule application result may also be skipped in other patterns. The user information 37 stored on the print server 3 may include, for example, the information registered in advance as to whether or not to make the respective users check the printing rule application result. When the setting not to make the user check the printing rule application result is configured with the user information 37 corresponding to the user who gave the instruction to send the print job, the print server 3 basically starts the process relating to the print job according to the printing rule application result without sending the printing rule application result to the information processing device 2.

The compromise of the security should be controlled also in the above-described example. The print server 3 receives the print job and produces the printing rule application result. The destination of the print job may be the image forming device 4 having the network address, the same as the network address of the information processing device 2. The user taking the printed output may be the same as the user who gave the instruction to send the print job. Or rather, the data to print may contain no confidential information. In such cases, therefore, the print server 3 proceeds with the process according to the printing rule application result. On the other hand, when the destination of the print job is the image forming device 4 having the network address different from the address of the information processing device 2, when the user taking the printed outputs is different from the user who gave the instruction to send the print job, or rather, when the data to print contains the confidential information, the print server 3 is preferably configured to send the printing rule application result to the information processing device 2 and make the user check the printing rule application result even when the setting not to make the user check the printing rule application result is configured with the user information 37 corresponding to the user who gave the instruction to send the print job.

According to the preferred embodiments, the user who gives the instruction to send the print job is allowed to check the printing rule application result in advance prior to the execution by the print server of the process according to the printing rule application result. The user is also allowed to give the instruction whether or not to continue the process according to the printing rule application result. When the print server automatically proceeds with the process to produce the printed output according to the printing rule application result, it may prevent from having the printed output unintended to the user who gave the instruction to send the print job produced. The compromise of the security is also allowed to be controlled.

(Modifications)

While the preferred embodiments of the present invention have been described above, the present invention is not limited to the preferred embodiments. Various modifications may be applied to the present invention.

In the preferred embodiments described above, an example of the printing rule registered as the rule information 35 is explained with FIG. 2. The item of the rule defining the condition for application of the printing rule and the item of the rule application result defining the process detail on the print job specified by applying the printing rule included in the respective printing rules are not necessarily the items same as those of FIG. 2. The printing rule including other items may also be registered. The item included in the printing rule may define the condition or the process detail aimed at cost saving as in the past. Further, the item may define the condition or process detail that could lead the compromise of the security if the printed output unintended to the user who gives the instruction to send the print job is produced as described in the above preferred embodiments.

What is claimed is:

1. An information processing device for sending a print job to a print server for applying a printing rule to the print job, thereby outputting the print job to one of a plurality of image forming devices, said information processing device and said print server being connected through a network, comprising:
a printing rule acquiring part for acquiring the printing rule to be applied to the print job from said print server;
a print job generation part for generating the print job to send to said print server;
a printing rule application result predictive part for applying the printing rule acquired by said printing rule acquiring part to the print job after the print job is generated by said print job generation part, and producing a printing rule application result showing a result of application by said print server of the printing rule;

a display part for displaying the printing rule application result produced by the printing rule application result predictive part;

a manipulation input part for receiving an entry of an instruction as to whether or not to continue a process relating to the print job with said printing rule application result being displayed with said display part; and a print job control part for making the process relating to the print job terminate in response to entry of the instruction to refuse continuation of the print job process via said manipulation input part, while making the print job process continue in response to entry of the instruction to permit the continuation of the print job process.

2. The information processing device according to claim 1, wherein said print job generation part generates the print job including attribution data containing information to which the printing rule is applied and drawing data for use by said image forming device in image formation, and said printing rule application result predictive part applies the printing rule, thereby producing said printing rule application result at a time said attribution data is generated by said print job generation part.

3. The information processing device according to claim 1, wherein said display part displays said printing rule application result when, according to the printing rule applied by said print server, a user who gives a job generation instruction is different from the user allowed to take a printed output produced in response to execution of the print job.

4. The information processing device according to claim 1, wherein said display part displays said printing rule application result when, according to the printing rule applied by said print server, said image forming device having a network address different from that of said information processing device is designated as a destination to which the print job is output.

5. The information processing device according to claim 1, wherein said display part displays said printing rule application result when data to be printed contains confidential information.

6. The information processing device according to claim 1, further comprising:

a storage part for storing therein setting information as to whether or not to display said printing rule application result, said setting information being configured in advance by the user, wherein said display part displays said printing rule application result when the setting information to display said printing rule application result is configured.

7. The information processing device according to claim 1, wherein as more than one user allowed to take the printed output produced in response to execution of the print job is determined according to said printing rule application result displayed by said display part, said manipulation input part receives an operation to select at least one of the more than one user, and said print job control part designates the at least one user selected with the operation received via said manipulation input part and makes the print job process continue.

8. The information processing device according to claim 1, wherein as more than one image forming devices are determined as the destination of the print job according to said printing rule application result displayed by said display part, said manipulation input part receives the operation to select at least one of the more than one image forming devices, and said print job control part designates the at least one image forming device selected with the operation received via said manipulation input part and makes the print job process continue.

9. A print server for applying a printing rule to a print job received from an information processing device, thereby outputting the print job to one of a plurality of image forming devices, comprising:

a storage part for storing therein the printing rule that determines the image forming device to which the print job is output among from said plurality of image forming devices;

a print job receipt part for receiving the print job from said information processing device;

a printing rule application part for applying the printing rule in said storage part to the print job received through said print job receipt part and determining the image forming device to which the print job is output among from said plurality of image forming devices;

a process continuation determination part for determining whether or not to continue a process relating to the print job based on a printing rule application result determined by said printing rule application part; and a print job output control part for outputting the print job to the image forming device determined by said printing rule application part in response to the determination by said printing rule application part to continue the process relating to the print job, wherein said process continuation determination part sends the printing rule in said storage part to said information processing device in response to a request from said information processing device, causes said information processing device to display said printing rule application result, and makes the print job process terminate responsive to entry from said information processing device of an instruction to refuse continuation of the print job process, while making the print job process continue responsive to entry of the instruction to permit the continuation of the print job process.

10. The print server according to claim 9, wherein the printing rule stored in said storage part further defines a user allowed to take a printed output produced in response to execution of the print job.

11. A print control system comprising an information processing device for sending a print job to a print server and said print server for outputting the print job thereby received to one of a plurality of image forming devices, said print server includes:

a storage part for storing therein a printing rule that determines at least one of items, the items including a user allowed to take a printed output produced in response to execution of the print job and the image forming device of said plurality of image forming devices to which the print job is output;

a print job receipt part for receiving the print job from said information processing device;

a printing rule application part for applying the printing rule in said storage part to the print job received through said print job receipt part and determining the image forming device to which the print job is output among from said plurality of image forming devices; and a print job output control part for performing an output process of the print job to the image forming device determined by said printing rule application part, and said information processing device includes:

a printing rule acquiring part for acquiring the printing rule to be applied to the print job from said print server;

a printing rule application result predictive part for applying the printing rule acquired by said printing rule acquiring part to the print job after the print job is generated, and producing a printing rule application result showing a result of application by said print server of the printing rule;

a display part for displaying the printing rule application result produced by the printing rule application result predictive part; and a manipulation input part for receiving an entry of an instruction as to whether or not to continue a print job process with said printing rule application result being displayed with said display part, wherein the print job process is made terminate responsive to entry of the instruction to refuse continuation of the print job process via said manipulation input part, while the print job process is made continue responsive to entry of the instruction to permit the continuation of the print job process.

12. A print control method for an information processing device to send a print job to a print server and for said print server to output the print job to one of a plurality of image forming devices, comprising the steps of:

(a) acquiring a printing rule to be applied to the print job from said print server;

(b) generating the print job in said information processing device;

(c) sending the print job by said information processing device to said print server;

(d) applying the printing rule to the print job received from said information processing device in said print server and producing a printing rule application result showing a result of application by said print server of the printing rule, thereby determining the image forming device to which the print job is output among from said plurality of image forming devices; and (e) outputting the print job by said print server to the image forming device determined in response to application of the printing rule, wherein said print control method further comprises the step of:

(f) displaying the printing rule application result by said information processing device and making a user check said displayed printing rule application result prior to said step (e).

13. A non-transitory computer readable recording medium on which a program is recorded, said program executable on an information processing device for sending a print job to a print server for applying a printing rule to the print job, thereby outputting the print job to one of a plurality of image forming devices, said information processing device and said print server being connected through a network, said program causing said information processing device to function as a system comprising:

a printing rule acquiring part for acquiring the printing rule to be applied to the print job from said print server;

a print job generation part for generating the print job to send to said print server;

a printing rule application result predictive part for applying the printing rule acquired by said printing rule acquiring part to the print job after the print job is generated by said print job generation part, and producing a printing rule application result showing a result of application by said print server of the printing rule;

a display control part for displaying at the image processing device the printing rule application result produced by the printing rule application result predictive part; and a print job control part for making a process relating to the print job terminate in response to entry of an instruction to refuse continuation of the print job process with said printing rule application result being displayed by said display control part, while making the print job process continue in response to entry of the instruction to permit the continuation of the print job process.

14. A non-transitory computer readable recording medium on which a program is recorded, said program executable on a print server for outputting a print job received from an information processing device to one of a plurality of image forming devices, said program causing said print server to function as a system comprising:

a registration part for registering a printing rule that determines the image forming device to which the print job is output among from said plurality of image forming devices;

a print job receipt part for receiving the print job from said information processing device;

a printing rule application part for applying the printing rule registered by said registration part to the print job received through said print job receipt part and determines the image forming device to which the print job is output among from said plurality of image forming devices;

a process continuation determination part for determining whether or not to continue a process relating to the print job based on a printing rule application result determined by said printing rule application part; and a print job output control part for outputting the print job to the image forming device determined by said printing rule application part in response to the determination by said printing rule application part to continue the process relating to the print job, wherein said process continuation determination part sends the printing rule in said storage part to said information processing device in response to a request from said information processing device, causes said information processing device to display said printing rule application result, and makes the print job process terminate in response to entry from said information processing device of an instruction to refuse continuation of the print job process, while making the print job process continue in response to entry of the instruction to permit the continuation of the print job process.

15. The information processing device according to claim 1, wherein the printing rule is to determine said image forming device to which the print job is output among from said plurality of image forming devices.

16. The information processing device according to claim 13, wherein the printing rule is to determine said image forming device to which the print job is output among from said plurality of image forming devices.

* * * * *